(12) United States Patent
Yoshitake et al.

(10) Patent No.: US 11,138,772 B2
(45) Date of Patent: Oct. 5, 2021

(54) SEARCH SYSTEM, SEARCH METHOD, AND MATERIAL PROPERTY DATABASE MANAGEMENT APPARATUS

(71) Applicant: NATIONAL INSTITUTE FOR MATERIALS SCIENCE, Tsukuba (JP)

(72) Inventors: Michiko Yoshitake, Tsukuba (JP); Shinjiro Yagyu, Tsukuba (JP); Toyohiro Chikyo, Tsukuba (JP); Isao Kuwajima, Tsukuba (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 39 days.

(21) Appl. No.: 16/306,575

(22) PCT Filed: Dec. 9, 2016

(86) PCT No.: PCT/JP2016/086739
§ 371 (c)(1),
(2) Date: Dec. 2, 2018

(87) PCT Pub. No.: WO2017/221444
PCT Pub. Date: Dec. 28, 2017

(65) Prior Publication Data
US 2019/0139279 A1      May 9, 2019

(30) Foreign Application Priority Data

Jun. 21, 2016   (JP) .............................. JP2016-122551

(51) Int. Cl.
*G06T 11/20*   (2006.01)
*G06F 16/90*   (2019.01)
*G06F 16/901*  (2019.01)

(52) U.S. Cl.
CPC ........ *G06T 11/206* (2013.01); *G06F 16/9024* (2019.01)

(58) Field of Classification Search
CPC .......................... G06T 11/206; G06F 16/9024
(Continued)

(56) References Cited

U.S. PATENT DOCUMENTS

| 6,509,898 B2* | 1/2003 | Chi | ...................... G06F 16/9558 345/440 |
| 2011/0227926 A1* | 9/2011 | Tjhi | ...................... G06Q 10/06 345/440 |

(Continued)

FOREIGN PATENT DOCUMENTS

| JP | 2007-018444 A | 1/2007 |
| JP | 2014-010812 A | 1/2014 |

OTHER PUBLICATIONS

International Search Report from International Patent Application No. PCT/JP2016/086739, dated Feb. 7, 2017.

(Continued)

*Primary Examiner* — Hai Tao Sun
(74) *Attorney, Agent, or Firm* — SGPatents PLLC

(57) ABSTRACT

Provided are a search system and a search method capable of searching an unknown combination of material property parameters having a significant relationship based on already known relationships from among multiple arbitrary combinations of material property parameters. The search system includes a database, a graph generator, and a graph searcher, and is configured as follows: the database stores the plurality of pairs of material property parameters having mutual relationships, and the graph generator generates a graph in which material property parameters stored in the database are nodes, and an inter-node corresponding to the pairs of material property parameters stored to have mutual relationships is an edge. The graph searcher searches the graph generated by the graph generator based on a given search condition and outputs a search result.

17 Claims, 13 Drawing Sheets

(58) Field of Classification Search
USPC .......................................................... 345/440
See application file for complete search history.

(56) References Cited

U.S. PATENT DOCUMENTS

| | | | |
|---|---|---|---|
| 2013/0218899 A1 | 8/2013 | Raghavan et al. | |
| 2014/0009472 A1* | 1/2014 | Ajitomi | G06F 16/9024 345/440 |
| 2014/0188861 A1* | 7/2014 | Angelo | G06F 16/9535 707/726 |
| 2016/0110476 A1* | 4/2016 | Shinkuma | G06F 16/28 707/741 |
| 2016/0167306 A1* | 6/2016 | Vidimce | G06F 30/00 264/40.1 |
| 2017/0161759 A1* | 6/2017 | Li | G06F 16/3329 |

OTHER PUBLICATIONS

Yoshitake, inventor presentation at the study group "Python introductory gathering" held by Python volunteer users, Jan. 27, 2016.

Yoshitake, inventor article entitled "Searching System on Network of Various Materials Properties for Materials Curation," Proceedings of the 63rd Japan Society of Applied Physics Spring Meeting, Mar. 3, 2016.

Yoshitake, slides used in inventor oral presentation at the 63rd Japan Society of Applied Physics Spring Meeting, Mar. 21, 2016.

Yoshitake et al., inventor poster entitled "[DS-8] 'Data generation and utilization'" presented at TIA Kakehashi Poster Session, Aug. 30, 2016.

Yoshitake, inventor article entitled "Development of Correlation Diagram of Materials Properties for Materials Curation," Fall Meeting of Japan Society of Applied Physics, vol. 77, No. 14a-D63-1, Sep. 1, 2016.

Yoshitake, inventor article entitled "Materials Curation: Material Design by Multi-Disciplinary Use of Material Information," Journal of the Japan Institute of Metals and Materials, vol. 80, No. 10, Sep. 9, 2016, pp. 603-611.

Extended European Search Report and European Search Opinion dated Nov. 6, 2020, in European Patent Application No. 18761977.0.

* cited by examiner

FIG. 9

INPUT FORM 11

| CAUSE-SIDE | RESULT-SIDE | PRESENCE/ABSENCE OF RELATIONSHIP | NOTES ON RELATIONSHIP | RELATIONSHIP CATEGORY 1 | RELATIONSHIP CATEGORY 2 | CONDITION NODE | CONDITION RELATIONSHIP |
|---|---|---|---|---|---|---|---|
| A | D | | | | | | |
| B | D | | | | | | |
| B | A | | | | | | |
| D | E | | | | | | |
| E | D | | | | | | |
| C | E | | | | | | |
| E | C | | | | | | |
| M | C | | | | | | |
| C | M | | | | | | |
| K | J | | | | | | |
| J | K | | | | | | |
| J | L | | | | | | |
| L | J | | | | | | |
| L | K | | | | | | |
| I | K | | | | | | |
| K | I | | | | | | |
| G | C | | | | | | |
| G | F | | | | | | |
| I | F | | | | | | |
| G | I | | | | | | |
| L | H | | | | | | |

FIG. 11

INPUT FORM 11

| CAUSE-SIDE MATERIAL PROPERTY PARAMETERS | RESULT-SIDE MATERIAL PROPERTY PARAMETERS | PRESENCE/ABSENCE OF RELATIONSHIP | NOTES ON RELATIONSHIP | RELATIONSHIP CATEGORY 1 | RELATIONSHIP CATEGORY 2 | CONDITION NODE | CONDITION | RELATIONSHIP |
|---|---|---|---|---|---|---|---|---|
| WORK FUNCTION | SURFACE TERM OF WORK FUNCTION | ABSENT | | 0 | | | | |
| SURFACE TERM OF WORK FUNCTION | WORK FUNCTION | PRESENT | | 1 | | | | |
| WORK FUNCTION | BULK TERM OF WORK FUNCTION | ABSENT | | 0 | | | | |
| BULK TERM OF WORK FUNCTION | WORK FUNCTION | PRESENT | | 1 | | | | |
| SURFACE TERM OF WORK FUNCTION | SURFACE DIPOLE | PRESENT | | 1 | | | | |
| SURFACE DIPOLE | SURFACE TERM OF WORK FUNCTION | PRESENT | | 1 | | | | |
| SURFACE DIPOLE | SURFACE CHARGE DISTRIBUTION | PRESENT | | 1 | | | | |
| SURFACE CHARGE DISTRIBUTION | SURFACE DIPOLE | ABSENT | | 0 | | | | |
| BULK TERM OF WORK FUNCTION | FERMI LEVEL DEPTH | PRESENT | | 1 | | | | |
| FERMI LEVEL DEPTH | BULK TERM OF WORK FUNCTION | PRESENT | | 1 | | | | |
| FERMI LEVEL DEPTH | BOND POTENTIAL DEPTH | PRESENT | | 2 | | | | |
| BOND POTENTIAL DEPTH | FERMI LEVEL DEPTH | PRESENT | | 2 | | | | |
| COMPOSITION | PRESENCE/ABSENCE OF SURFACE SEGREGATION | PRESENT | | 1 | | | | |
| PRESENCE/ABSENCE OF SURFACE SEGREGATION | COMPOSITION | PRESENT | | 1 | | | | |
| PRESENCE/ABSENCE OF SURFACE SEGREGATION | SURFACE COMPOSITION | PRESENT | | 2 | | | | |
| PRESENCE/ABSENCE OF SURFACE SEGREGATION | BULK COMPOSITION | PRESENT | | 2 | | | | |
| BOND POTENTIAL DEPTH | TENSILE STRENGTH | PRESENT | | 2 | | | | |
| TENSILE STRENGTH | BOND POTENTIAL DEPTH | PRESENT | | 2 | | | CONDITION 1 | |
| TENSILE STRENGTH | VICKERS HARDNESS | PRESENT | | 1 | | | CONDITION 2 | |
| VICKERS HARDNESS | TENSILE STRENGTH | PRESENT | | 1 | | | CONDITION 2 | |
| BULK COMPOSITION | FERMI LEVEL DEPTH | PRESENT | | 1 | | | | |

Groupings (left-side bracket):
- SURFACE PHYSICS
- CHEMICAL BONDING THEORY
- SURFACE THERMODYNAMICS
- MATERIAL DYNAMICS
- SOLID PHYSICS CONDITION 1: SUBSTANCE NOT EXHIBITING SUPERPLASTICITY
CONDITION 2: PROPORTIONAL RELATIONSHIP ON CONDITION THAT SUBSTANCES ARE TRANSITION METAL CARBIDES

SEARCH SYSTEM, SEARCH METHOD, AND MATERIAL PROPERTY DATABASE MANAGEMENT APPARATUS

TECHNICAL FIELD

The present invention relates to a search system and a search method using a database, and a material property database management apparatus thereof, and more particularly, to a search system, a search method, and a material property database management apparatus capable of being preferably used for searching a relationship from among a plurality of material property parameters.

BACKGROUND ART

An objective of prediction and design in material research is to identify materials having target characteristics. A method that has been widely used to achieve this object is to identify a material having target characteristics from a condition-characteristic chart. The method is: observing a change in a characteristic upon changing in one specific condition among multiple conditions and creating a chart, interpolating or extrapolating the chart, and obtaining a condition under which the target characteristic is achieved, thereby identifying a material that matches the target characteristics. The term "chart" herein is synonymous with "graph" which represents a line graph etc. However, a "chart" is hereafter used to distinguish from a "graph" consisting of nodes and edges, which will be described later.

Here, a change in characteristics upon changing one specific condition among multiple conditions is often obtained experimentally. This is because, even if many literatures are searched, it is difficult to obtain a large amount of data of which all the conditions except for the above specified condition are the same.

PTL 1 discloses a search system capable of objectively searching constituent substance information of a new material having desired characteristics.

The search system disclosed in PTL 1 includes a database having multiple pieces of material property parameter information for each of multiple (many) substances. For example, when there are m material property parameters for n substances, the database is expressed as a table of n columns and m rows. Here, an individual substance may include not only material property parameters to obtain real data but also material property parameters to which real data is not provided. That is, there may be blanks in the table of n rows and m columns.

Two-dimensional space or three or more-dimensional space are created with the material property parameter to be searched as one axis and some of the other material property parameters as other axes, and each of substances in the database is mapped in the space. At this time, material property parameters without real data are interpolated by virtual data predicted by multivariate analysis, calculation based on a predetermined logical expression, the first principle calculation, etc.

A search map obtained by mapping real data and virtual data is considered to define a substance having desired characteristics is specified based on a rule defined in advance.

PRIOR ART DOCUMENT

Patent Document

PTL 1: Japanese Patent Application Laid-Open No. 2007-18444

SUMMARY OF THE INVENTION

Problems to be Solved by the Invention

The inventors have studied PTL 1 and found new problems as follows.

In the technique described in PTL 1, relationships among multiple material property parameters are used to predict virtual data. The relationships among material property parameters are relationships based on scientific evidence existing between different material property parameters, that is, theoretically explained and formulated relationships. For example, a calculation based on the above predetermined logical formula and the first-principle calculation are also included in these relationships. In addition to these relationships, an experimentally obtained relationship also exists. There are many material property parameters known to have mutual relationships when obvious correlation thereamong is found from experimental data even at a stage at which neither theoretical explanation nor formulation has been made. In particular, by searching across multiple technical fields, combinations of material property parameters known to have relationships thereamong can be increased.

When search is conducted across multiple technical fields as described above, the number of material property parameters becomes very large. Therefore, the number of arbitrary combinations regardless of the relationship is to be calculated mathematically, i.e., a huge number. When the number of material property parameters to be treated is K, an arbitrary combination of two material property parameters among them is $K! \times (K-1)!/2$. Therefore, relationships that can be used in the related art search systems as that described in PTL 1 are limited to already known combinations among combinations of material property parameters. In order to extend the above limits to combinations regarding which relationships are unknown, since the number of arbitrary combinations is significantly large as described above, selection of promising combinations largely depends on a user's own knowledge and experience. However, when search is conducted across multiple technical fields, it is unrealistic to expect users to possess extensive knowledge and experience covering the entire technical fields.

As a result of extensive studies on a method for extracting such an unknown relationship among material property parameters, the inventors have found that it is highly possible that relationships of a plurality of material property parameters which have not been considered due to weak relevance across technical fields themselves actually exist.

An object of the invention is to provide a search system and a search method capable of searching an unknown combination of material property parameters having a significant relationship based on already known relationships from among multiple arbitrary combinations of material property parameters.

Means for solving such a problem will be described below. Other problems and novel features will be apparent from the description of the specification and the accompanying drawings.

Means for Solving the Problem

According to one embodiment, the following is provided. That is, a search system includes a database, a graph generator, and a graph searcher, and is configured as follows.

The database stores a plurality of pairs of physical property parameters having mutual relationships, and the graph generator generates a graph in which nodes correspond to the material property parameters stored in the database, and edges each of which is in between nodes corresponding to each pair of the plurality of pairs of physical property parameters stored to have mutual relationships. The graph searcher searches the graph generated by the graph generator based on a given search condition and outputs a search result.

Effect of the Invention

The effect obtained by the above embodiment will be briefly described below.

That is, a search system and a search method capable of searching an unknown combination of material property parameters having a significant relationship based on already known relationships from among multiple arbitrary combinations of material property parameters can be provided.

BRIEF DESCRIPTION OF THE DRAWINGS

FIG. 9 is an explanatory diagram illustrating an example of an input form for configuring a database of the search system according to the second embodiment.

FIG. 11 is an explanatory diagram illustrating an example of a more specific input form of a database according to a fourth embodiment.

DETAILED DESCRIPTION OF THE INVENTION

1. Outline of Embodiment

Figure 1:
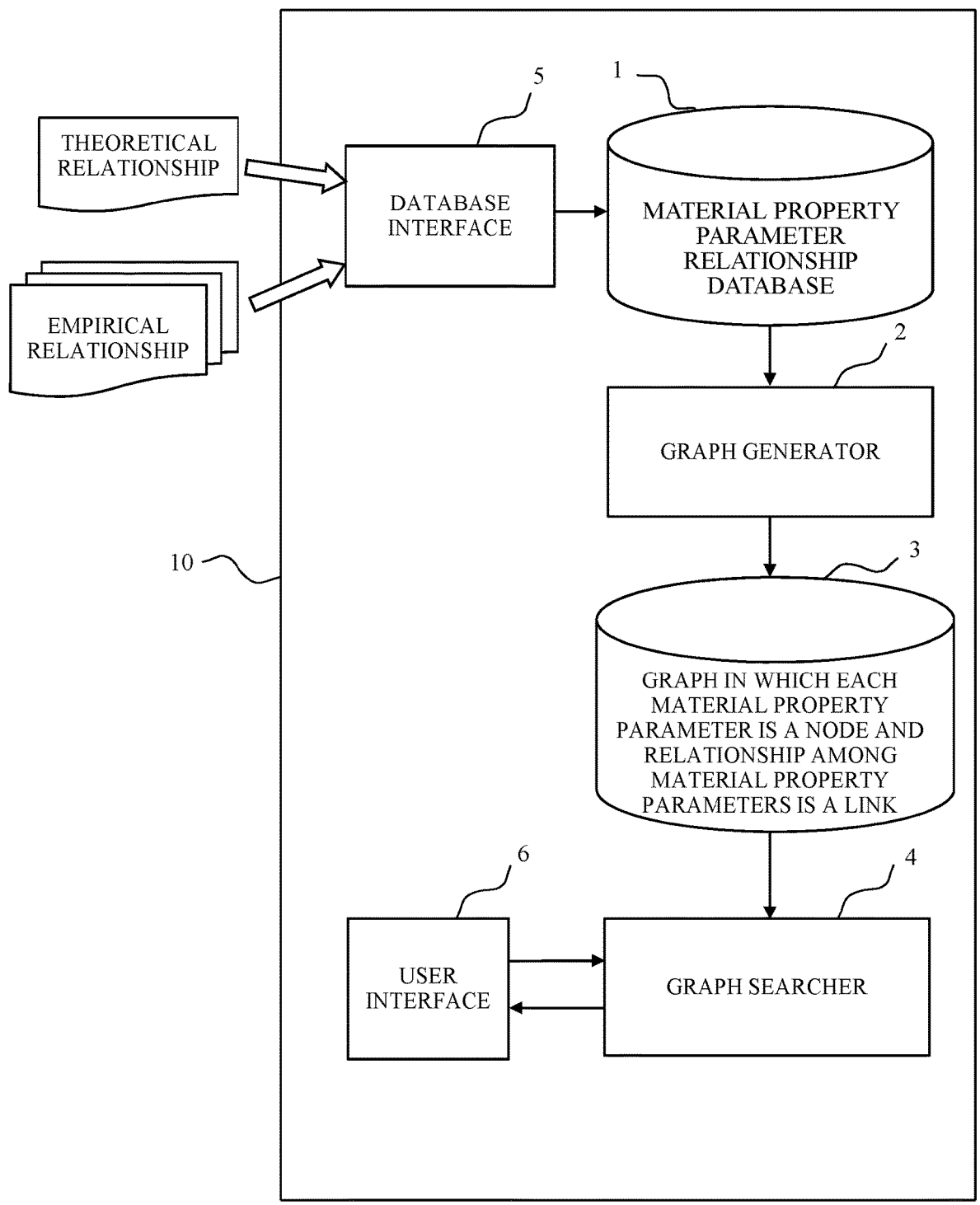
FIG. 1 is a block diagram illustrating a configuration example of a search system according to a first embodiment.

First, an outline of a representative embodiment disclosed in the present application will be described. Reference signs in the drawings referred to in the parentheses in the description of the outline of the representative embodiment are merely illustrative of those included in concepts of constituent elements to which reference is made.

[1] <Search for Graph in which Material Property Parameters are Nodes and Relationships are Edges (FIG. 1)>

A search system (10) includes a database (1), a graph generator (2), and a graph searcher (4), and is configured as follows.

The database stores a plurality of pairs of material property parameters having mutual relationships, and the graph generator generates a graph (3) in which nodes correspond to the material property parameters stored in the database, and in which each edge in between nodes correspond to each of the plurality of pairs of material property parameters stored to have mutual relationships. The graph searcher (4) searches the graph based on a given search condition and outputs a search result.

Therefore, the search system (10) capable of searching an unknown combination of material property parameters having a significant relationship based on already known relationships from among multiple arbitrary combinations of material property parameters can be provided. The database (2) stores a plurality of pairs of material property parameters, each of the plurality of pairs having a mutual relationship. Here, pairs of material property parameters having mutual relationships may not only be pairs of material property parameters based on scientific evidence-based relationships, that is, theoretically explained relationships, but also pairs of material property parameters known to have mutual relationships when obvious correlation is found therebetween from experimental data even at a stage at which neither theoretical explanation nor formulation has been made. Note that the "theoretically explained relationship" may include not only formulated relationships like theorems and formulae but also widely semi-quantitatively or qualitatively relationships explaining that presence/absence of correlation or positive/negative of correlation coefficients (i.e., while one of the correlation coefficients increases, the other also increases or decreases, etc.). Here, relationships known in any field do not necessarily have to be particularly excluded, and pairs of material property parameters of which relationships are known in every field may be included. By making the relationships that have been known only in different technical fields be integrated and shown in a graph, it is possible to conduct a route search covering the entire graph regardless of whether all the relationships are known in any technical fields. Therefore, an unknown relationship among material property parameters can be found newly.

[2] <Directed Graph (FIG. 4, FIG. 6)>

In Section [1], the graph may be a directed graph.

When a relationship between a pair of material property parameters is bidirectional, the graph generator (2) generates a bidirectional edge corresponding to the pair of material property parameters, and when a value of a first material property parameter of a pair of material property parameters is determined, a value of a second material property parameter is determined but not vice versa, a one-way edge from a node corresponding to the first material property parameter to a node corresponding to the second material property parameter is generated as an edge corresponding to the pair of material property parameters.

In this manner, it is possible to properly treat a one-way relationship such as having a causal relationship, which may improve accuracy in route searching.

[3] <Conditional Edge (FIG. 8, FIG. 9)>

In Section [1] or [2], the search system (10) further includes a condition extractor (7) and a route evaluator (8).

Regarding a pair of material property parameters in which a condition for prescribing presence/absence of a relationship exists among the plurality of pairs of material property parameters having mutual relationships, the database (1) is further capable of storing that condition.

The condition extractor (7) extracts the condition from the database in association with the condition with an edge corresponding to a pair of material property parameters for which presence/absence of a relationship is prescribed by that condition being defined as a conditional edge.

The graph searcher (4) extracts one or multiple routes from the graph as a search result and outputs the extracted routes. Here, presence/absence of the condition is not considered.

The route evaluator (8) determines whether the conditional edge is included in the extracted one or multiple routes and, regarding a route that includes the conditional edge, when the condition corresponding to the conditional edge is not satisfied, the route is excluded from the one or multiple routes, and outputs the routes as a search result.

Therefore, even a complicated relationship such that presence/absence of a relationship changes depending on a value of the material property parameter corresponding to the relationship or a value of another material property parameter can be included in a search range. As described above, a condition for determining presence/absence of a relationship is extracted in advance from the database (1), and whether a conditional edge is included in each of multiple routes output as a search result is determined. When a conditional edge is included, it is possible, by determining whether the condition has been satisfied, to exclude routes passing through edges not satisfying the condition from the search result and output the routes as a search result. Therefore, even when a conditional edge is included, a route search with higher accuracy can be conducted.

[4] <Edge with Reliability Information (FIG. 9)>

In [1] or [2], the database (1) is further capable of storing reliability information of a relationship indicating that, the database from among the plurality of pairs of material property parameters having mutual relationships, a relationship is a theoretically established relationship or a relationship is an empirically correlated but not yet theoretically established relationship.

When the condition about the reliability information is included in the search condition, the graph searcher (4) searches the graph based on a search condition including that condition and outputs a search result.

Therefore, a user can designate a search condition, such as to search a highly-reliable relationship with priority, whereby the user can conduct a route search with higher accuracy.

[5] <Edges with Reliability Information (FIG. 8, FIG. 9)>

In Section [1] or [2], the search system (10) further includes a condition extractor (7) and a route evaluator (8).

The database (1) is further capable of storing reliability information of a relationship indicating that, from among the plurality of pairs of material property parameters having mutual relationships, a relationship is a theoretically established relationship or a relationship is an empirically correlated but not yet theoretically established relationship.

The condition extractor (7) extracts the reliability information from the database in association with the edge.

The graph searcher (4) extracts one or multiple routes from the graph as the search result irrespective of whether a condition on the reliability information is included in the search condition, and outputs to the route evaluator (8).

The route evaluator (8) determines whether an edge with which the reliability information is associated is included in the one or multiple routes and, regarding a route that includes the edge with which the reliability information is associated, the route evaluator (8) excludes, when the condition about reliability information is not satisfied, the route from the one or multiple routes, and outputs the result as a search result.

Therefore, as in Section [4], a user can designate a search condition, such as to search a highly-reliable relationship with priority, whereby the user can conduct a route search with higher accuracy.

[6] <Rule Check of Input Form (FIG. 8)>

In any one of Sections [1] to [5], the search system (10) further includes a database interface unit (5).

The database interface unit (5) determines whether a pair of material property parameters input from the outside and a relationship thereof conform to a predetermined input rule (9).The database interface unit (5) stores the pair of material property parameters and their relationships conforming to the input rule (9) in the database (1) and conducts a predetermined error process on the pair of material property parameters and their relationships not conforming to the input rule (9).

Therefore, the database (1) can be properly managed so that no inappropriate data like a pair of material property parameters having inconsistent relationships is erroneously written in the database (1).

[7] <Material Property Database Management Apparatus (FIG. 16)>

A material property database management apparatus (20) includes the database (3) held in a storage device, the graph generator (2) implemented by software on a computer, and an interface unit (5), and is configured as follows.

The database (3) is graph type information in which each of the plurality of material property parameters is associated with a single node, and an edge is provided between nodes corresponding to a pair of material property parameters having a relationship among pairs of material property parameters included in the plurality of material property parameters.

Through the interface unit (5), a pair of material property parameters and a relationship thereof can be input with respect to the graph generator (2).The graph generator (2) checks whether the database (3) includes nodes corresponding to the material property parameters constituting the input pair of material property parameters and edges corresponding to the relationship thereof, and adds nodes and/or edges not included in the database (3) to the database (3).

In this manner, a material property database that is useful for configuring a search system capable of searching an unknown combination of material property parameters having a significant relationship based on already known relationships from among multiple arbitrary combinations of material property parameters can be provided.

In the description of this Section [7] and each of the subsequent Sections, the graph (3) itself is described to be managed as a database (3) in a graph form without distinguishing the database (1) from the graph (3). However, as in Sections [1] to [6], the database 1 and the graph 3 may be changed to be managed in a distinguished manner.

[8] <Directed Graph (FIG. 4, FIG. 6)>

In Section [7], the database (3) may be a directed graph.

When a relationship between a pair of material property parameters is bidirectional, the graph generator (2) generates a bidirectional edge corresponding to the pair of material property parameters, and when a value of a first material property parameter of a pair of material property parameters is determined, a value of a second material property parameter is determined but not vice versa, a one-way edge from a node corresponding to the first material property parameter to a node corresponding to the second material property parameter is generated as an edge corresponding to the pair of material property parameters.

Therefore, a material property database that can appropriately treat one-way relationships having causal relationships and contribute to improvement in accuracy in route search can be provided.

[9] <Conditional Edge (FIG. 8, FIG. 9, FIG. 16)>

In Section [7] or [8], the material property database management apparatus (20) further includes a condition extractor (7).

Regarding a pair of material property parameters in which a condition for prescribing presence/absence of a relationship exists among the plurality of pairs of material property parameters having mutual relationships, the database (3) is further capable of storing that condition.

The condition extractor (7) extracts the condition from the database in association with the condition with an edge corresponding to a pair of material property parameters for which presence/absence of a relationship is prescribed by that condition being defined as a conditional edge.

Therefore, even a complicated relationship such that presence/absence of a relationship changes depending on a value of the material property parameter corresponding to the relationship or a value of another material property parameter can be included in a search range. A condition that determines presence/absence of a relationship as described above is extracted in advance from the graph information included in the database (3) and held in the database (3). For example, one or multiple material property database search terminals 21_1 and 21_2 connected via a network 200 may determine whether a conditional edge is included in each of multiple routes output as a search result. When a conditional edge is included, it is possible, by determining whether the condition has been satisfied, to exclude routes passing through edges not satisfying the condition from the search result and output the search result. Therefore, even when a conditional edge is included, a route search with higher accuracy can be conducted.

[10] <Edges with Reliability Information (FIG. 9, FIG. 16)>

In Section [7] or [8], the database (3) is further capable of storing reliability information of a relationship indicating that, the database from among multiple pairs of material property parameters having mutual relationships, a relationship is a theoretically established relationship or a relationship is an empirically correlated but not yet theoretically established relationship.

For example, since one or multiple material property database search terminals 21_1 and 21_2 connected via the network 200 include a graph searcher (4), when the condition about the reliability information is included in the search condition, the graph searcher (4) can search the graph based on a search condition including that condition.

Therefore, a user can designate a search condition, such as to search a highly-reliable relationship with priority, in a material property database search terminal, whereby the user can conduct a route search with higher accuracy.

[11] <Edge with Reliability Information (FIG. 8, FIG. 9, FIG. 16)>

In Section [7] or [8], the material property database management apparatus (20) further includes a condition extractor (7).

The database (3) is further capable of storing reliability information of a relationship indicating that, the database from among the plurality of pairs of material property parameters having mutual relationships, a relationship is a theoretically established relationship or a relationship is an empirically correlated but not yet theoretically established relationship.

The condition extractor (7) extracts the reliability information from the database in association with the edge.

For example, since one or multiple material property database search terminals 21_1 and 21_2 connected via the network 200 include the graph searcher (4), as in Section [4], a user can designate a search condition, such as to search a highly-reliable relationship with priority, whereby the user can conduct a route search with higher accuracy. The graph searcher (4) extracts one or multiple routes from the graph as the search result irrespective of whether a condition on the reliability information is included in the search condition, and outputs to the route evaluator (8). The route evaluator (8) determines whether an edge with which the reliability information is associated is included in the one or multiple routes and, regarding a route that includes the edge with which the reliability information is associated, the route evaluator (8) excludes, when the condition about reliability information is not satisfied, the route from the one or multiple routes, and outputs the result as a search result.

2. Detailed Description of Embodiment

The embodiments will be described in further detail.
[First Embodiment]

FIG. 1 is a block diagram illustrating a configuration example of a search system according to the first embodiment.

A search system 10 includes a database 1 that stores relationships of material property parameters, a graph generator 2, and a graph searcher 4. The database 1 stores a plurality of pairs of material property parameters having mutual relationships. Which pairs of material property parameters mutually have relationships is established theoretically, described in textbooks, etc. and therefore widely known. Besides, even though not fully explained theoretically, empirically known relationships may be included. The graph generator generates a graph 3 in which material property parameters stored in the database 1 are nodes, and inter-nodes corresponding to the pairs of material property parameters having mutual relationships are edges. The graph searcher 4 searches the graph 3 based on a given search condition and outputs a search result.

Therefore, the search system 10 can search, from among given combinations of the plurality of material property parameters, an unknown combination of material property parameters having a significant relationship therebetween, on the basis of known relationships. The search system 10 collects pairs of material property parameters having mutual relationships to be stored in the database 1 that stores the relationships of material property parameters from as many technical fields as possible. The search system 10 collectively expresses the pairs of material property parameters in a single graph 3, whereby a route search covering the graph 3 becomes possible. Here, a "single graph" is composed of a plurality of nodes and a plurality of edges, that are sides or branches, connecting the nodes, and all the nodes are directly or indirectly connected by any one of the edges. A single graph may be a collection of multiple graphs (sometimes referred to as a partial graph). Since expression by using the graph 3 enables a search based only on presence/absence of the edge irrespective of what kind of technical field the relationship corresponding to the edge has been known, search can be conducted across many fields. Therefore, an unknown combination of material property parameters having a significant relationship can also be found. Various route search methods based on mathematical algorithms can be applied to the graph searcher 4.

Preferably, the search system 10 may further include a database interface 5 and a user interface 6. The database interface 5 supports management functions of the database 1 such as writing information about relationships of the material property parameters into the database 1, and reading and confirming the information stored in the database 1 thereafter. The search condition can be provided to the graph searcher 4 through the user interface 6, and the search result can be output to the outside. The database interface 5 and the user interface 6 do not necessarily have to be limited to human interfaces, and may be interfaces to other databases and search systems.

The search system 10 of the present invention is constructed to function as software on a hardware system including a storage device and a computer.

Figure 2:
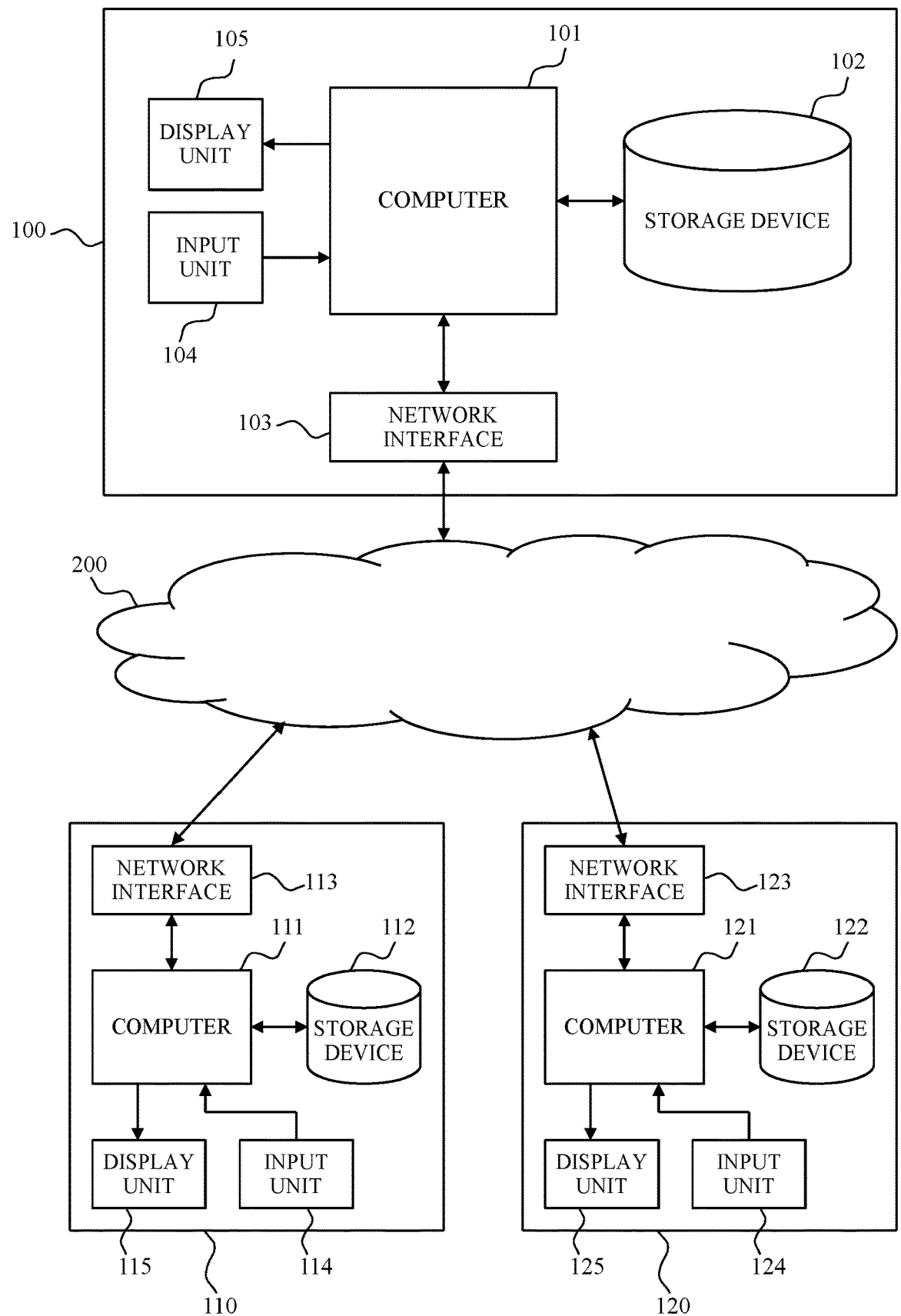
FIG. 2 is a block diagram illustrating an example of a hardware system in which the search system of the invention is implemented.

FIG. 2 is a block diagram illustrating an example of the hardware system in which the search system 10 of the invention is implemented.

A server 100 and user-side workstations 110 and 120 are connected to the network 200 such as the Internet. The server 100 includes a computer 101, a storage device 102, a network interface 103, an input unit 104, and a display unit 105. If the input and output via the network 200 is sufficient, the input unit 104 and the display unit 105 do not necessarily have to be provided. The user-side workstations 110 and 120 also have computers 111 and 121, storage devices 112 and 122, network interfaces 113 and 123, input units 114 and 124, and display units 115 and 125, respectively.

The database 1 of the search system 10 is stored in the storage device 102, and the graph generator 2 is software running on the computer 101. The graph 3 generated by the graph generator 2 is stored in the storage device 102 as intermediate data and is used as input data of the graph searcher 4 implemented as software on the computer 101. A search condition is provided from the user-side workstations 110 and 120 to the graph searcher 4, and the search result is returned to the workstations 110 and 120.

The graph searcher 4 may be implemented as software on the computers 111 and 121 of the user's workstations 110 and 120. At this time, the graph 3 is supplied from the server 100 in response to a request from the user-side workstations 110 and 120. Prior to the route search of the graph 3, the graph 3 may be downloaded and stored in the storage devices 112 and 122 of the workstations 110 and 120. Therefore, a route search process by the graph searcher 4 is speeded up. Especially when many users are to conduct the graph search process at the same time, it is possible to prevent the processing load from being concentrated on the server 100.

Furthermore, the graph generator 2 may also be implemented as software on the computers 111 and 121 of the user-side workstations 110 and 120. Also, in this case, similarly, when many users are to conduct the graph search process at the same time, concentration of processing load on the server 100 can be prevented, and an additional pair of material property parameters on the user side can be added. Since each user can have their own graph 3, it is possible to conduct a search covering a graph other than those graphs owned by other users. For example, it is possible to experimentally add a pair of material property parameters.

The search system 10 according to the first embodiment will be described in more detail.

Figure 3:
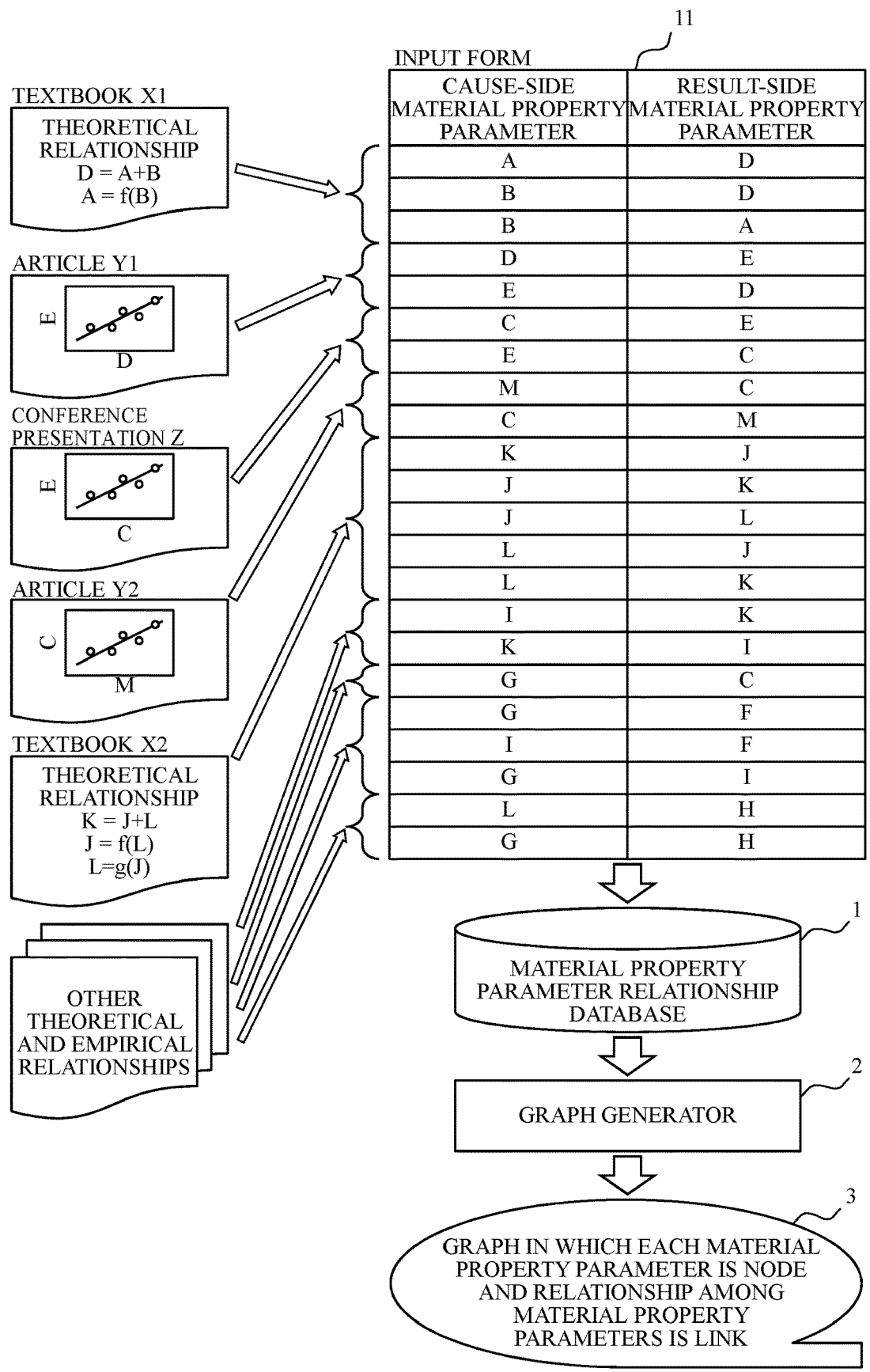
FIG. 3 is an explanatory diagram illustrating a configuration example of a database of the search system according to the first embodiment.

FIG. 3 is an explanatory diagram illustrating a configuration example of the database 1. As an example, an input form 11 of the database 1 is illustrated. The input form 11 is a table in which each pair of material property parameters having mutual relationships are shown in each row. A first column is a cause-side material property parameter, and a second column is a result-side material property parameter. Although the material property parameters do not necessarily have to be divided into the cause-side and the result-side, there is an advantage that a relationship having directionality in causality can also be expressed. When there are bidirectional relationships, the relationships are described by using two rows in which the material property parameters on the cause-side and the result-side are exchanged.

As illustrated in FIG. 3, when "D=A+B" is formulated as a theoretical relationship in the textbook X1, the cause-side material property parameters are A and B, and the result-side material property parameter is D (the second row and a third row), when "A=f(B)" is formulated is a function in which B is input and A is output, and when the inverse function is undefinable, the cause-side material property parameter is B and the result-side material property parameter is A (a fourth row). When a paper Y1 shows that data (chart) indicating material property parameters D and E are in good correlation, the relationship is input in a fifth row and a sixth row. Similarly, when data (chart) indicating material property parameters C and E are in good correlation is presented in a conference Z, the relationship is input in a seventh row and an eighth row. Similarly, hereinafter, the relationship between material property parameters M and C shown in a paper Y2 is input in a ninth row and a 10th row, the relationships between material property parameters K and J, K and L, J and L, and L and J derived from a theoretical formula shown in a textbook X2 is shown in an 11th row to a 15th row, and, in addition, the relationships between the material property parameters I and K, G and C, G and F, G and I, I and F, L and H, and G and H, which are known theoretically or empirically are input in a 16th row to a 23rd row, respectively.

The relationship between multiple pairs of material property parameters entered and input in the input form 11 is taken into the computer and stored as the database 1. The graph generator 2 generates a graph 3 in which the database 1 is input, each material property parameter corresponds a node, and presence/absence of mutual relationship among the material property parameters corresponds an edge. In FIG. 3, the input form 11 and the database 1 are depicted as clearly distinguished from each other, but the input form 11 may be referred to as the database 1. This is because if two sets of material property parameters (pairs) described on the same column of the input form 11 are defined as two nodes and an edge is defined between the two nodes, the information is substantially equivalent to a graph.

Figure 4:
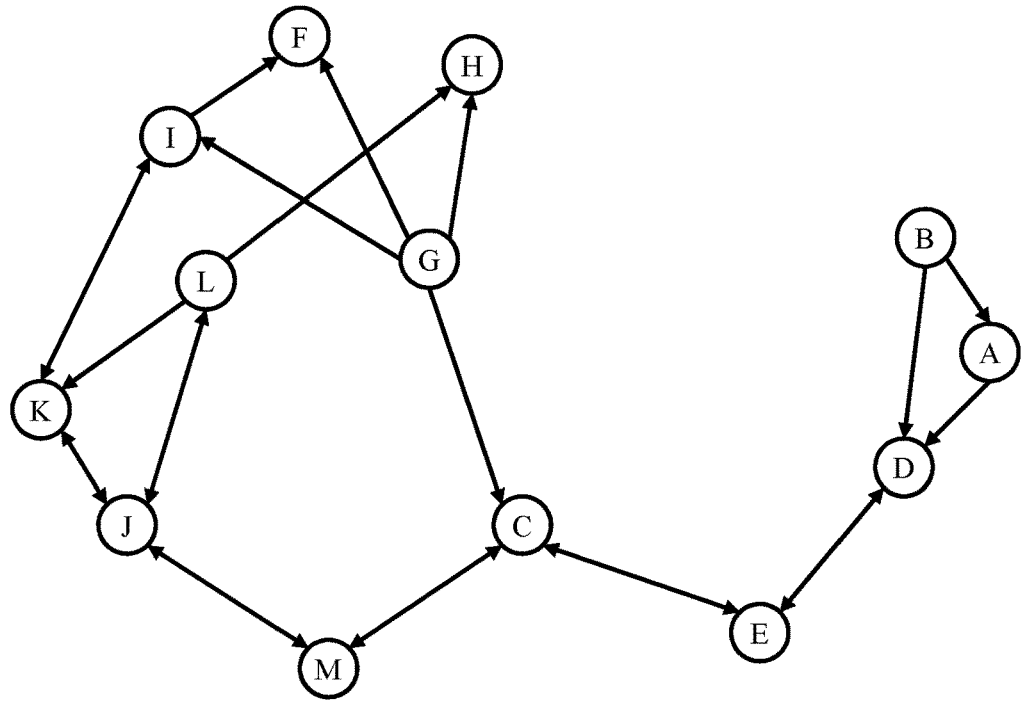
FIG. 4 is an explanatory diagram illustrating an example of a graph to be generated (a directed graph).
Figure 5:
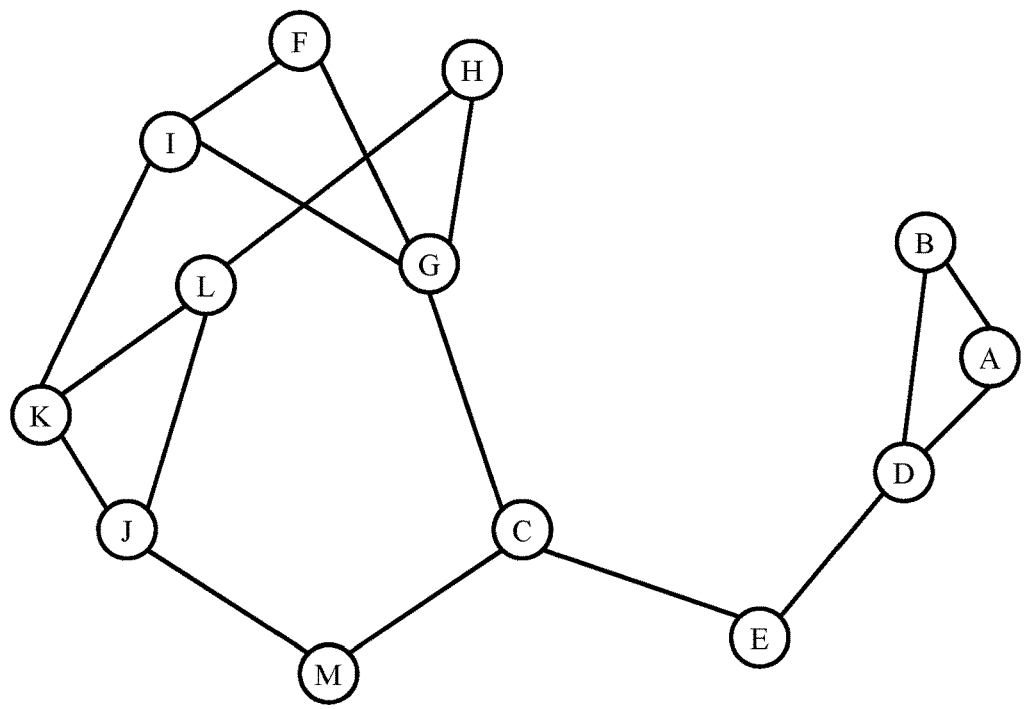
FIG. 5 is an explanatory diagram illustrating an example of a graph to be generated (an undirected graph).

FIG. 4 illustrates an example of a case in which the generated graph 3 is a directed graph. Alternatively, the graph 3 may be an undirected graph. FIG. 5 illustrates an example of a case in which the generated graph 3 is an undirected graph.

Figure 6:
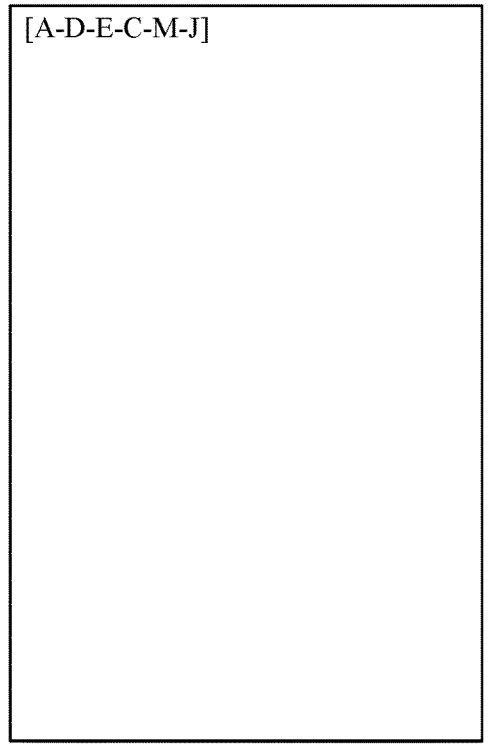
FIG. 6 is an explanatory diagram illustrating an example of a route search result of a directed graph.
Figure 7:
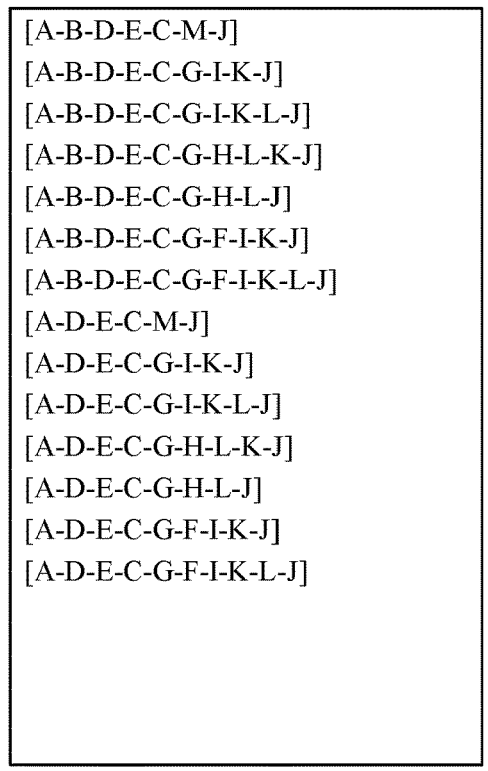
FIG. 7 is an explanatory diagram illustrating an example of a route search result of an undirected graph.

The graph searcher 4 conducts a route search covering the graph 3 under a given search condition. For example, if a user wishes to know presence/absence of a causal relationship with the material property parameter A being a cause side and J being a result side, the graph searcher 4 is given a search condition where a node A is set to be a start point and a node J is set to be an end point, and is then made to conduct a route search. As a result, in a case of the directed graph illustrated in FIG. 4, a route search result as illustrated in FIG. 6 is obtained, and in a case of the undirected graph illustrated in FIG. 5, a route search result as illustrated in FIG. 7 is obtained.

The search condition to be given to the graph searcher 4 may be arbitrarily changed in addition to that described above: setting the start point and the end point. As a search condition, for example, an end point and the number of nodes to reach the end point may be designated, and the graph searcher 4 may be controlled to list all the routes of which length to the end point is within the number of nodes. In this manner, material property parameters having a relatively strong relationship with a specific material property parameter can be comprehensively listed.

The textbooks X1 and X2, the articles Y1 and Y2, and the conference presentation Z are textbooks, articles, conference presentations etc. preferably in completely different fields. Therefore, the relationship between the material property parameters A and D known in the textbook X1, the relationship between the material property parameters D and E known in the article Y1, the relationship between the material property parameters E and C known in the conference presentation Z, the relationship between the material property parameters C and M known in the article Y2, and the relationship between the material property parameters M and J known in the textbook X2 may be followed in this order to obtain new knowledge that the material property parameters A and J have a relationship. Although the new relationship obtained here is a relationship that can exist merely mathematically and it may be necessary to determine whether that relationship is an actually valid relationship after physical evaluation, such a relationship is worth providing at least notice to researchers who are users.

The format of the input form 11 illustrated in FIG. 3 is illustrative only, and may be arbitrarily changed or other information may be added.

For example, when the graph 3 that is a search range of the graph searcher 4 is an undirected graph, it is unnecessary to distinguish the cause-side and the result-side regarding the pair of material property parameters, so two mutually related material property parameters may be written in a random order. Therefore, storage capacity of the storage device 102 for storing the database 1 and the graph 3 can be reduced smaller than in the case of the directed graph.

Even in a directed graph, in the input form 11, following the description of two parameters, information indicating bidirectional, forward or reverse direction may be described as the relationship.

Other information to be added to the database 1 may include, for example, the reliability of the relationship of the pair of material property parameters. While a theoretically proved and widely recognized relationship is significantly reliable, a relationship for which experimental data showing existence of correlation between two material property parameters has been obtained, but data on additional experiments for confirming reproducibility has not yet been obtained, and a theoretical explanation explaining the relationship is merely a hypothesis, reliability of the latter relationship may desirably be considered to be low. Such reliability information is additionally input in the database 1 and, may be associated with the length of the edge in the graph 3, and may be treated as a distance of the route in the graph searcher 4, for example. For example, the length of an edge with high reliability is set to 1, and as the reliability becomes lower, the longer edges may be associated like 2, 3, 4, and so on.

In the first embodiment, the database 1 and the graph 3 are distinguished from each other, but alternatively the graph 3 itself may be managed as a graph type database.

In general, a "database" is a collection of data grouped together that allows multiple users to use. The database can be categorized into several types: a hierarchical database, a networked database, and a relational database. However, the database 1 in the present invention may be of any type. It is sufficient that the database 1 of the present invention contains at least data constituting the graph 3, that is, the relationship between the material property parameter corresponding to each node and the pair of material property parameters corresponding to the edge as an aggregate of data, or the database 1 may be composed only of a collection of data constituting the graph 3.

Figure 16:
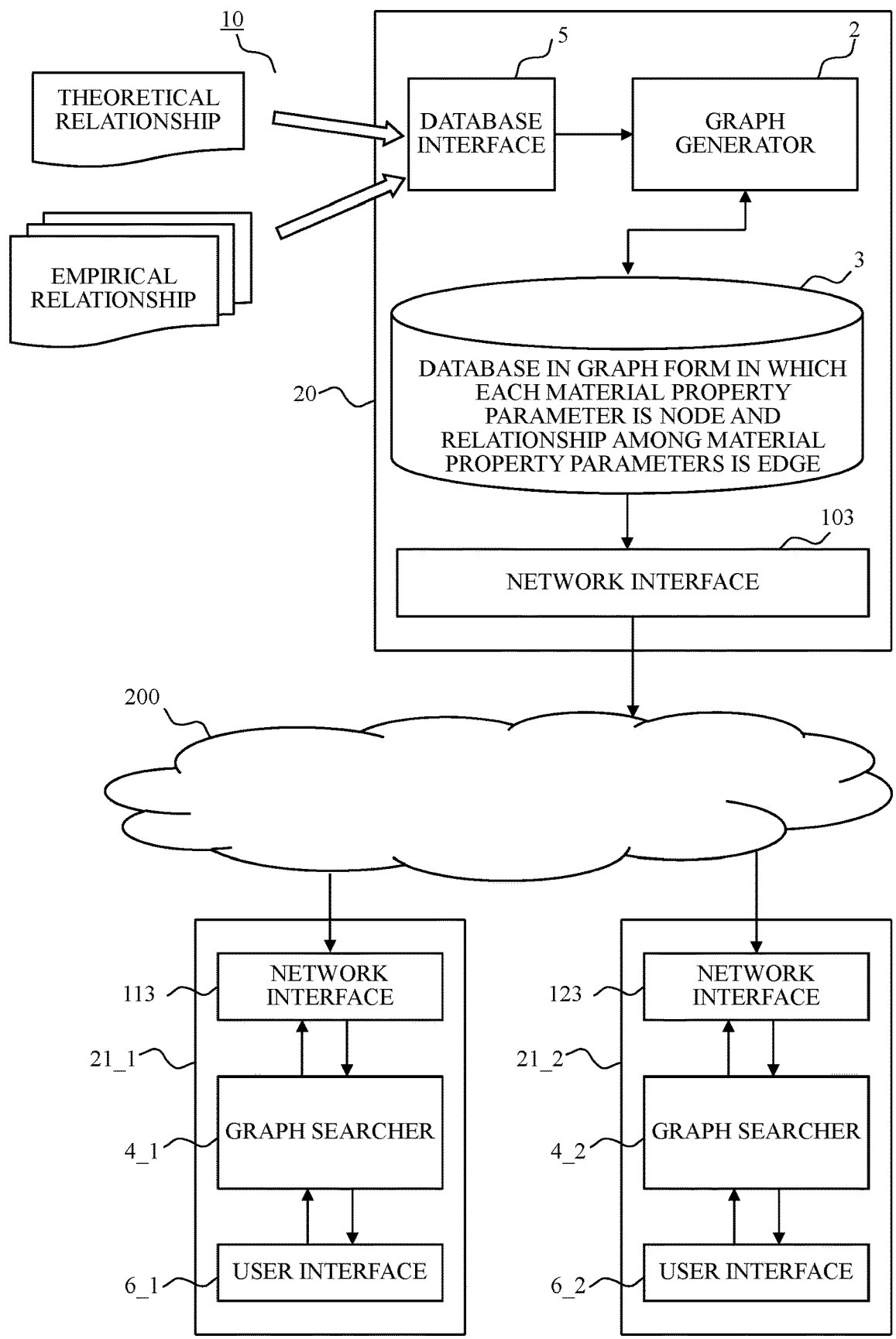
FIG. 16 is an explanatory diagram illustrating a configuration example of a search system including a material property database management apparatus according to a sixth embodiment.

In that case, as illustrated in FIG. 16 cited in a later-described sixth embodiment, the constituent element, the database 1, may be omitted and an access may be enabled, from the database interface 5 via the graph generator 2, to a graph in which each material property parameter is a node and a relationship between the material property parameters are an edge. The graph at this time is regarded as a form of a database, referred to as a "graph type database," and a reference code thereof is "3" following that of the graph. This is because the graph type database acts as a range of a route search, etc. by using a graph theory.

Such a change in the embodiment can be similarly applied to each of the following embodiments.

[Second Embodiment]

Presence/absence or contents of a relationship between some pairs of material property parameters may change depending on conditions. For example, a tensile strength and a Vickers hardness are proportional to each other on condition that the materials are transition metal carbides. This is because the tensile strength of the transition metal carbide is determined by the shear strength, where the tensile strength and the Vickers hardness are in a proportional relationship, when the tensile strength is determined by the shear strength. Also, there is a relationship between the tensile strength and the depth of the bonding potential on condition that it is a substance not exhibiting superplasticity. Therefore, in searching a relationship between the material property parameters, it is necessary to determine presence/absence of a route and a distance by taking such conditions into consideration.

In order to treat a conditional relationship of the pair of material property parameters, it is possible to solve by changing the graph searcher 4 to software implementing a graph search algorithm capable of handling a conditional edge. It is therefore possible to deal with the conditional relationship as it is without changing the configuration of FIG. 1.

On the other hand, incorporating such a condition determination into a general graph search sometimes is not always an appropriate solution. Purely mathematical algorithms have been established for route searching of graphs, and software libraries implementing them have already been provided. In the present invention, by mapping the relationship of the material property parameters to the graph 3, it has become possible to use various kinds of search algorithms based on such general graph theory. For this reason, software libraries implementing such a graph search algorithm are extremely consistent when applied to the graph searcher 4 of the invention, and many software libraries are applicable to the graph searcher 4 as they are. On the contrary, limited types of software libraries implementing a graph search algorithm supporting the conditional edges as described above can be applied to the graph searcher 4 of the present invention, and alternatively, adding a condition determination function to a software library implementing a general graph search algorithm requires a number of man-hours for programming to be added, and there is an increased risk of incorporating program bugs.

Figure 8:
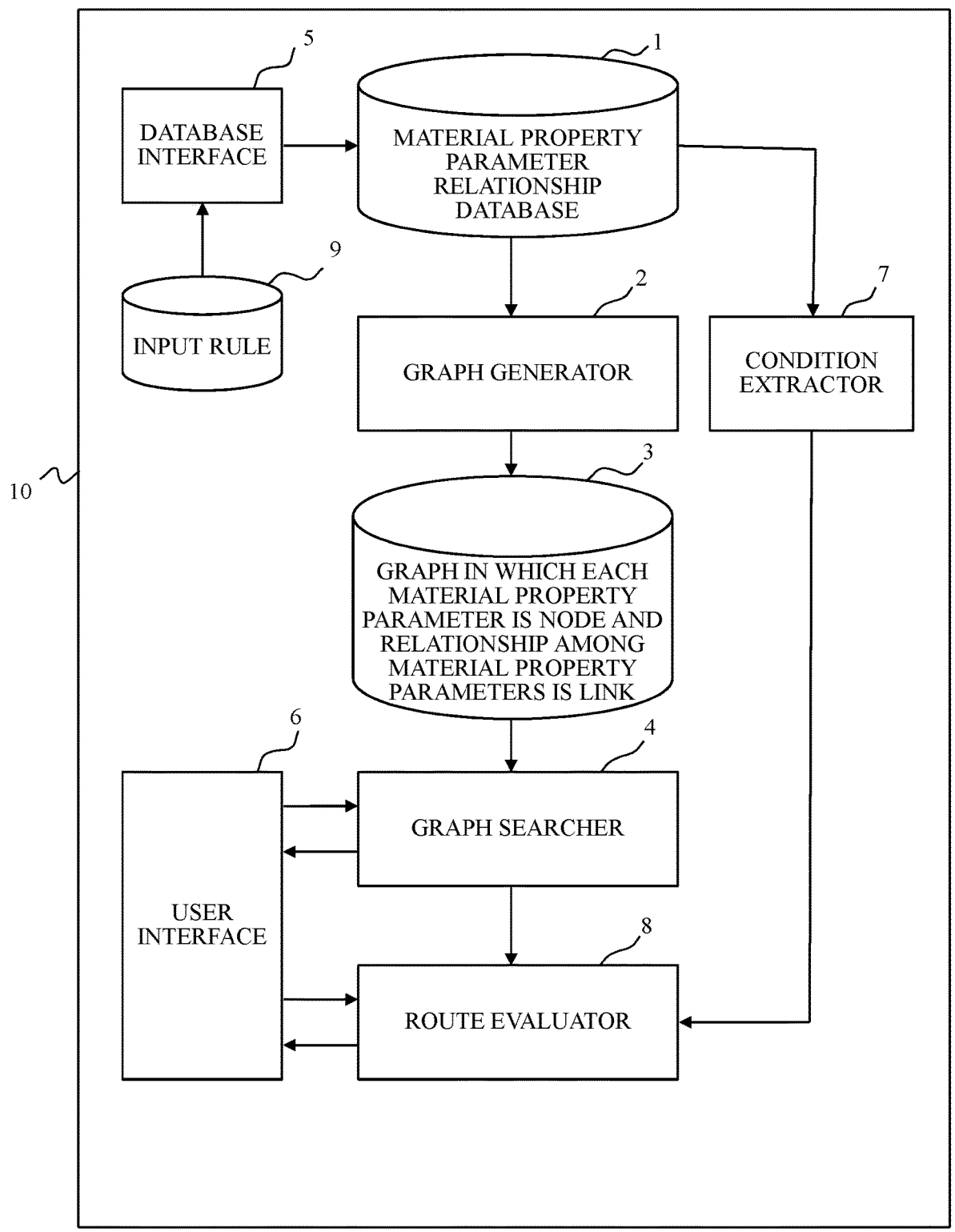
FIG. 8 is a block diagram illustrating a configuration example of a search system according to a second embodiment.

FIG. 8 is a block diagram illustrating a configuration example of the search system 10 according to a second embodiment. Compared to the search system 10 illustrated in FIG. 1, a search system 10 according to the second embodiment includes a condition extractor 7, a route evaluator 8, and an input rule 9.

Regarding the pair of material property parameters in which a condition for prescribing presence/absence of a relationship exists among multiple pairs of material property parameters having mutual relationships in the database 1, the condition is further stored in the database 1. The condition extractor 7 extracts the condition from the database 1 in association with an edge corresponding to a pair of material property parameters of which presence/absence is defined by the condition (conditional edge). The graph searcher 4 conducts the route search of the graph 3 and outputs the search result, but presence/absence of the conditional edge is not considered at this time. The route evaluator 8 determines whether a conditional edge is included in the extracted route and determines whether the condition is satisfied for a route including a conditional edge. When the condition is not satisfied, the route including a conditional edge but not satisfying the condition is excluded from the result output from the graph searcher 4, and output the routes as a search result.

Therefore, even a complicated relationship such that presence/absence of a relationship changes depending on a value of the material property parameter corresponding to the relationship or a value of another material property parameter can be included in a search range. On the other hand, the graph searcher 4 does not necessarily have to additionally have a function to search a graph including conditional edges, and general graph search software can be applied in exactly the same way as in the first embodiment.

In the present embodiment, a conditional edge has been described using a directed graph as an example, but an embodiment including conditional edges may also be implemented in an undirected graph.

In this example, a case in which the condition determines presence/absence of a relationship, that is, presence/absence of an edge is described. In this way, when a condition determines the contents of the relationship, there may be various embodiments.

For example, the user is made to input information corresponding to the condition for determining the content of the relationship together with the search condition from the user interface and the route evaluator determines whether the condition is satisfied and outputs the determination result as additional information of the searched route. Alternatively, without the input of information by the user, the route evaluator outputs an edge between the material property parameters included in the route and a condition for determining the contents of the relationship in addition to the search result in association with the searched route.

The input rule 9 is supplied to the database interface 5, and describes rules with which the data input by the input form 11 is supposed to comply. For example, a processing method in a case in which the same pairs of material property parameters are described in multiple positions is described. If mutually inconsistent relationship information is described regarding the same material property parameter pair, an error is output. If the information has been updated, a new relationship is preferentially registered in the database 1 and then a warning is output.

The function of supplying the input rule 9 to the database interface 5 and checking the contents of the input form 11 can be similarly added to the search system 10 of the first embodiment illustrated in FIG. 1.

FIG. 9 is an explanatory diagram illustrating an example of the input form 11 for configuring the database 1 of the search system 10. Compared with the example of the input form 11 illustrated in FIG. 3, presence/absence of a relationship, a relationship memo, a relationship category 1, a relationship category 2, a condition node, a condition, and a relationship are added. The relationship category may be, for example, reliability information described in the first embodiment. When a condition is a value (content) of a specific material property parameter, the condition node describes a node corresponding to the material property parameter, and the value or content thereof is described in the condition.

If the relationship is formulated, the formula is described in the relationship, and if the relationship is empirical, the approximate expression is described in the relationship. A qualitative relationship may be described in place of a formula or by mixed with a formula defined for a pair of material property parameters. For example, whether there is a positive correlation or a negative correlation may be described. By using all the expressions on a route in the search results, newly found relationships in pairs of material property parameters can be formulated. When a qualitative relationship is included in a route as a search result, a newly found qualitative relationship in a pair of material property parameters can be found. For example, in the route illustrated in FIG. 6, in order to increase the material property parameter J, a suggestion to change the substance into a substance having a smaller material property parameter A can be obtained.

As described above, in the database 1, in addition to a simple relationship, information indicating reliability of a relationship, a condition for prescribing presence/absence or content of a relationship, an expression indicating a relationship, or a qualitative relationship can be further included. These pieces of information can be used for the route search in the graph searcher 4 or can be supplied to the route evaluator 8 via the condition extractor 7 to be used as additional information of the extracted route.

[Third Embodiment]

In the search system 10 according to the second embodiment illustrated in FIG. 8, the processing route from the graph generator 2 to the graph searcher 4 is commonalized with a simple model not assuming the conditional edge as in the first embodiment illustrated in FIG. 1. However, it is necessary to transmit the condition extracted from the database 1 by the condition extractor 7 to the route evaluator 8.

In the search system 10 according to the second embodiment illustrated in FIG. 8, as described with reference to FIG. 2 in the first embodiment, the graph searcher 4 may be implemented as software operating on the server 100, or may be implemented as software on the computers 111 and 121 of the user's workstations 110 and 120. In such a case, it is natural that the condition extractor 7 is implemented in the server 100, whereas the route evaluator 8 is implemented in the computers 111 and 121 of the user's workstations 110 and 120. The condition extractor 7 implemented in the server 100 extracts a conditional edge and a condition thereof, but it is not necessary to determine whether the condition has been satisfied. Whether the condition of the conditional edge is actually satisfied may be determined by the route evaluator 8 implemented in the user-side workstations 110 and 120. When whether the condition of the conditional edge is actually satisfied is determined by individual specific concrete physical properties specific to the user's search, it is unnecessary to transmit the physical properties to the server. Further, the burden of the server 100 to determine whether the condition is satisfactory or unsatisfactory each time the search is conducted is reduced. On the other hand, it is necessary to transmit the condition extracted by the condition extractor 7 from the database 1 to the route evaluator 8. Therefore, it is necessary to define a protocol to be on a communication packet via the network 200.

Figure 10:
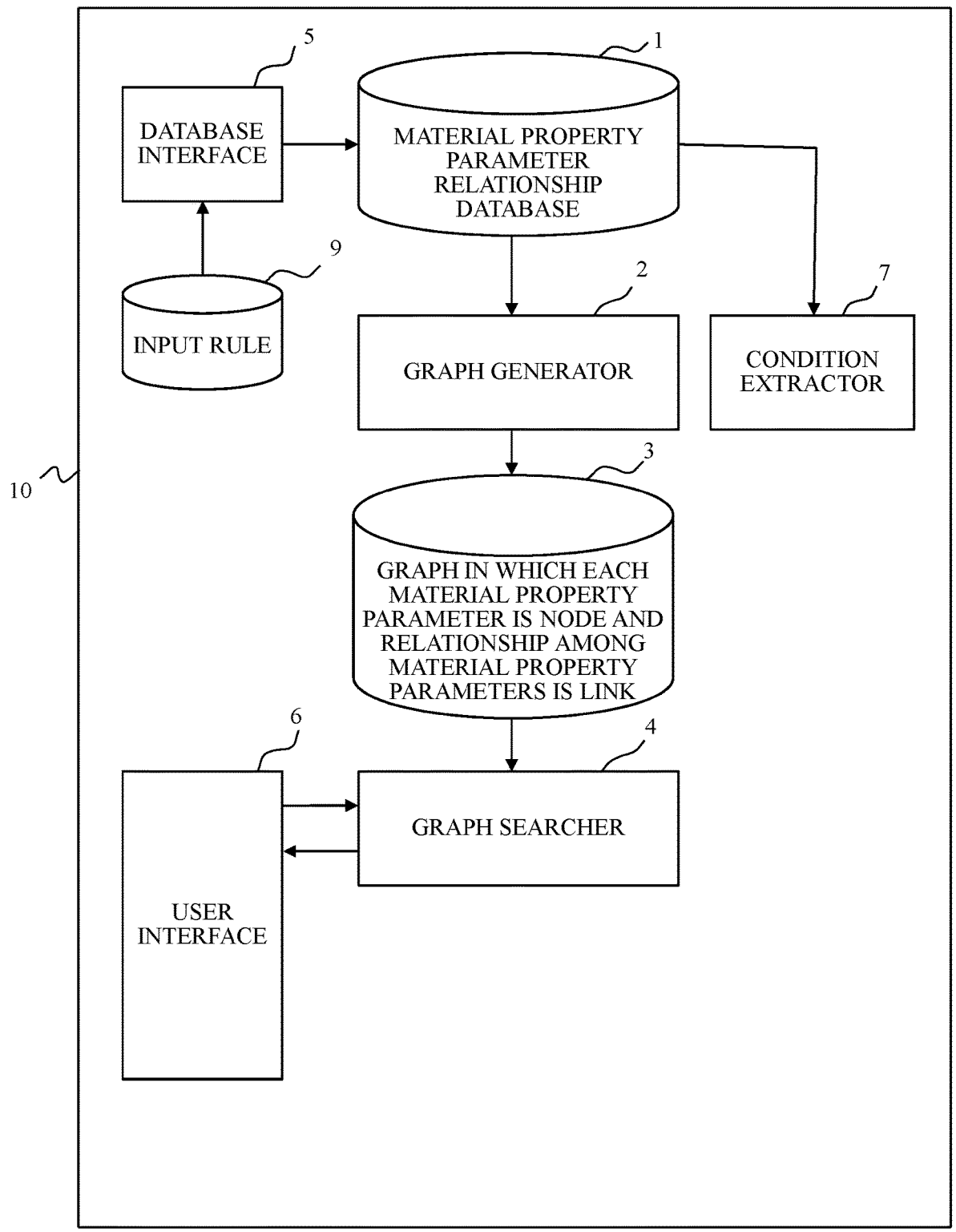
FIG. 10 is a block diagram illustrating a configuration example of a search system according to a third embodiment.

FIG. 10 is a block diagram illustrating a configuration example of a search system 10 according to the third embodiment. Compared to the search system 10 illustrated in FIG. 8, a condition extracted by a condition extractor 7 is input in a graph generator 2, and a route evaluator 8 is omitted.

Regarding a pair of material property parameters in which a condition for prescribing presence/absence of a relationship exists among multiple pairs of material property parameters having mutual relationships in a database 1, the condition is further stored in the database 1. The condition extractor 7 extracts the condition from the database 1 in association with an edge corresponding to a pair of material property parameters of which presence/absence is defined by the condition (conditional edge). The extracted conditions are input in the graph generator 2. When generating a graph from the database 1, the graph generator 2 also determines as to whether the condition is satisfied for the conditional edge. As a result, if the condition is satisfied, a graph 3 including the conditional edge is generated, and if the condition is not satisfied, the graph 3 without including the conditional edge is generated.

A graph searcher 4 conducts the route search of the graph 3 and outputs the search result. At this time, since the edge that does not satisfy the condition is not included in the graph 3, presence/absence of a conditional edge or whether the condition is satisfied do not necessarily have to be considered and it is sufficient to output the result of the route search.

Therefore, even a complicated relationship such that presence/absence of a relationship changes depending on a value of the material property parameter corresponding to the relationship or a value of another material property parameter can be included in a search range. Further, the graph searcher 4 does not necessarily additionally have a function to search a graph including conditional edges, and general graph search software may be used as in the first embodiment. Furthermore, even when the graph searcher 4 is implemented in a computer environment different from that of the graph generator 2, it is unnecessary to transmit information about conditional edges by network communication etc.

In the present embodiment, a conditional edge has been described using a directed graph as an example, but an embodiment including conditional edges may also be implemented in an undirected graph.

[Fourth Embodiment]

In the first, the second, and the third embodiments, the embodiments are described with material property parameters abstracted, such as A, B, C, etc., and in the fourth embodiment, an example in which specific parameters are applied to the material property parameters will be described.

FIG. 11 is an explanatory diagram illustrating an example of the input form 11 of the more specific database 1. In this example, reliability is input as numerical values in the item "Relationship category 1." When there is no relationship, reliability=0. When there is a theoretically established relationship, reliability=1. A relationship based on a correlation obtained by a theoretical deduction or an experiment is expressed as reliability=2.

From the knowledge in the field of surface physics, presence/absence of mutual relationships are prescribed between a work function and surface terms thereof, bulk terms thereof, and surface dipole, surface charge distribution, and Fermi level depth. The relationship between the Fermi level depth and the bond potential depth is derived in a deducible manner based on a chemical bonding theory. The relationship between composition and presence/absence of surface segregation, and the relationship between surface composition and bulk composition are based on surface thermodynamics. The relationship among a tensile strength, a Vickers hardness and a bonding potential depth is based on material mechanics, and the relationship between bulk composition and a Fermi level depth are based on solid physics. Further, the relationship between a tensile strength and a bond potential depth is found when a condition 1 that "a material does not exhibit superplasticity" is satisfied. Between a tensile strength and a Vickers hardness, a condition 2 of "a proportional relationship if the material is transition metal carbide" is prescribed. In this manner, knowledge in many fields is consolidated in a single database 1.

Figure 12:
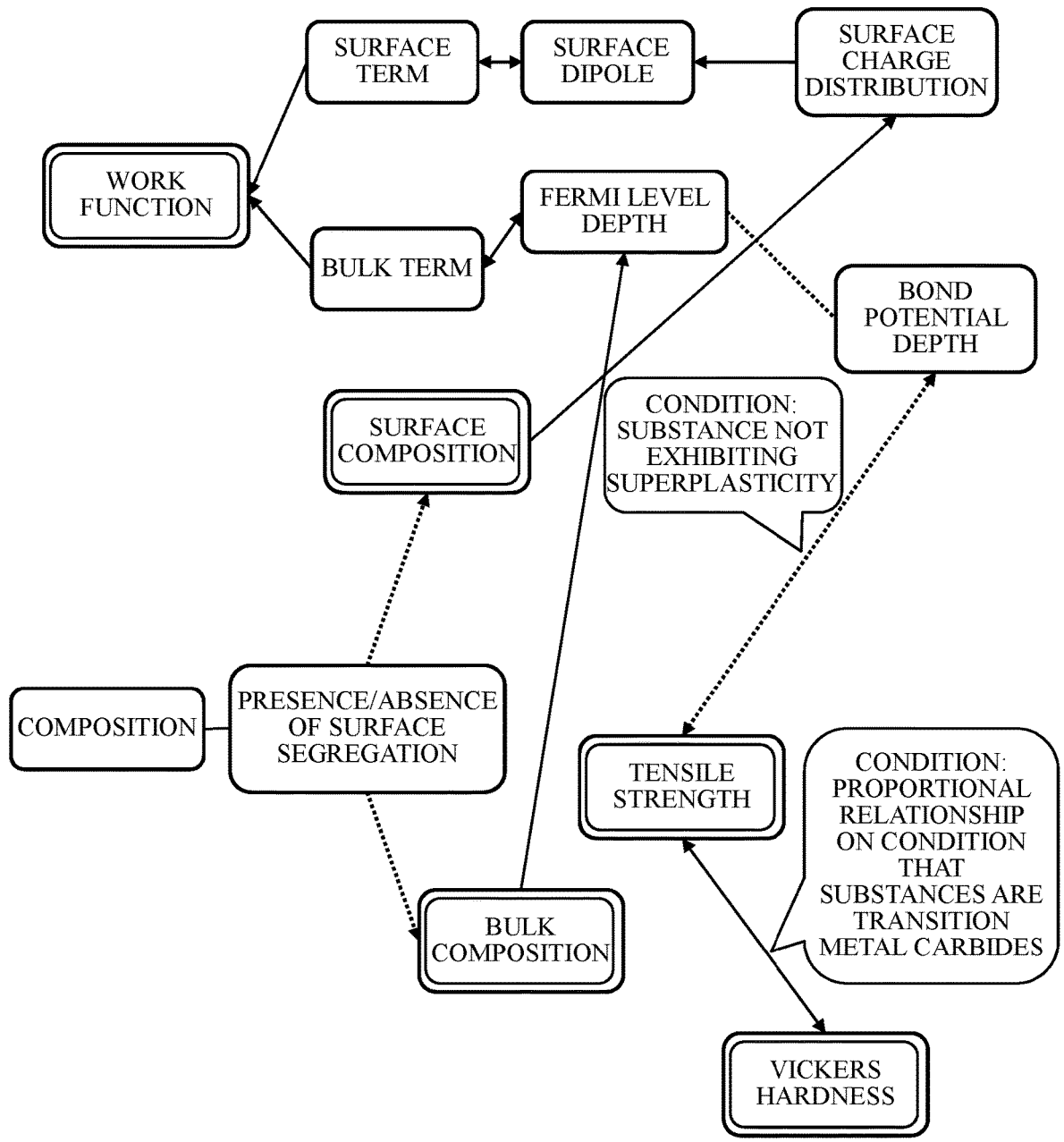
FIG. 12 is an explanatory diagram illustrating a graph generated from FIG. 11.

FIG. 12 is an explanatory diagram illustrating a graph 3 generated from FIG. 11. The graph 3 is a directed graph in which a cause-side material property parameter is a starting point and a result-side material property parameter is an end point. Edges of reliability=1 are illustrated by solid lines, and edges of reliability=2 are illustrated by broken lines. Since reliability=0 has no relationship, there is no corresponding edge. Since the conditions 1 and 2 do not belong to either the node or the edge of the graph 3, the conditions 1 and 2 are illustrated in association with corresponding edges with which relationship is prescribed. Measurable material property parameters are illustrated with double border lines.

It is found that there is a relationship between a Vickers hardness and a work function by conducting a route search through the graph 3. The route is: a Vickers hardness—a tensile strength—a bond potential depth—a Fermi level depth—a bulk term of a work function—a work function. This route represents a cross-field relationship which can be found for the first time when searching across the fields of knowledge in the material mechanics, knowledge in the chemical bonding theory, and knowledge in the surface physics. As described above, the search system 10 of the invention collectively expresses knowledge of multiple different fields in a single graph and enables searching across the fields, whereby a user can find existence of relationship(s) across fields between material property parameters which seemingly have no relationship.

[Fifth Embodiment]

Pairs of material property parameters having a relationship based on another knowledge can be newly added to a database 1. As the pairs of material property parameters are added, the graph 3 to be generated is expanded. As a result, it is possible to integrate multiple graphs which are regarded not to be mutually related and have been separate graphs into a single graph. This creates new route(s), whereby a possibility that a user can find existence of new relationship(s) between material property parameters which seemingly have no relationship.

Figure 13:
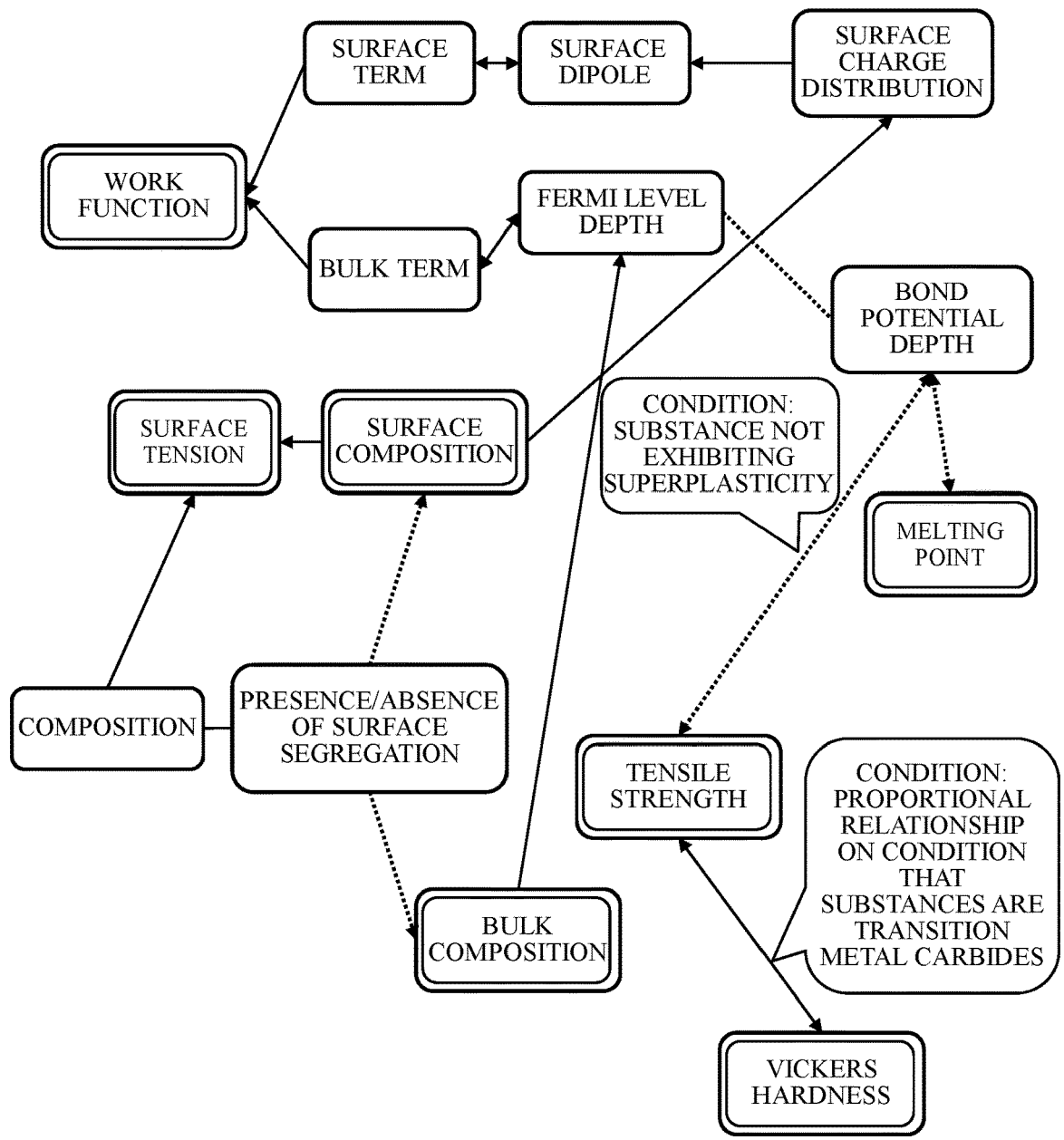
FIG. 13 is an explanatory diagram illustrating an example in which nodes having relationships based on different knowledge are added to the graph illustrated in FIG. 12.

FIG. 13 is an explanatory diagram illustrating an example in which nodes having relationships based on other knowledge are newly added to the graph illustrated in FIG. 12. To the graph illustrated in FIG. 12, a node "surface tension" and an edge between "composition" and "surface composition" are added, and a node "melting point" and an edge between "melting point" and "bond potential depth" are added.

Figure 14:
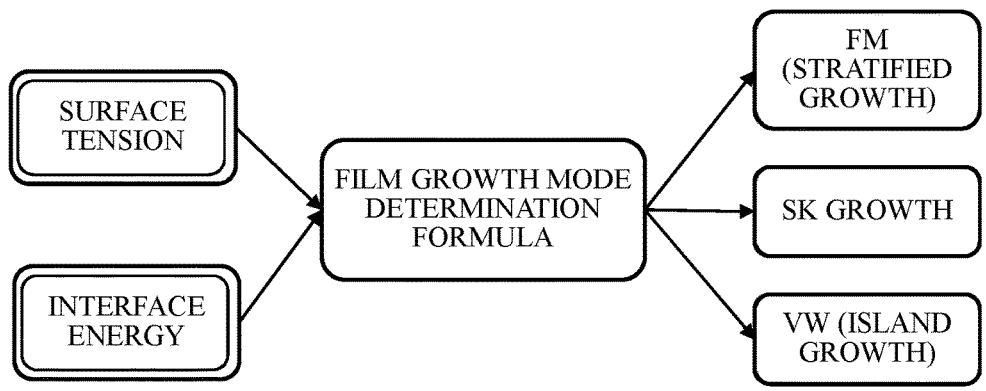
FIG. 14 is an explanatory diagram illustrating another example of a graph with no relevance to the graph illustrated in FIG. 12.

FIG. 14 is an explanatory diagram illustrating another example of a graph with no relevance to the graph illustrated in FIG. 12. FIG. 14 is a graph having six nodes "surface tension," "interface energy," "film growth mode determination formula," "FM (layered growth)," "SK growth," and "VW (island growth)." However, since none of the nodes has a relationship with the nodes included in the graph of FIG. 12, or at least information indicating such a relationship is not input in the database 1, the graph of FIG. 14 is treated as a separate graph from the graph illustrated in FIG. 12 when a route search is conducted.

Figure 15:
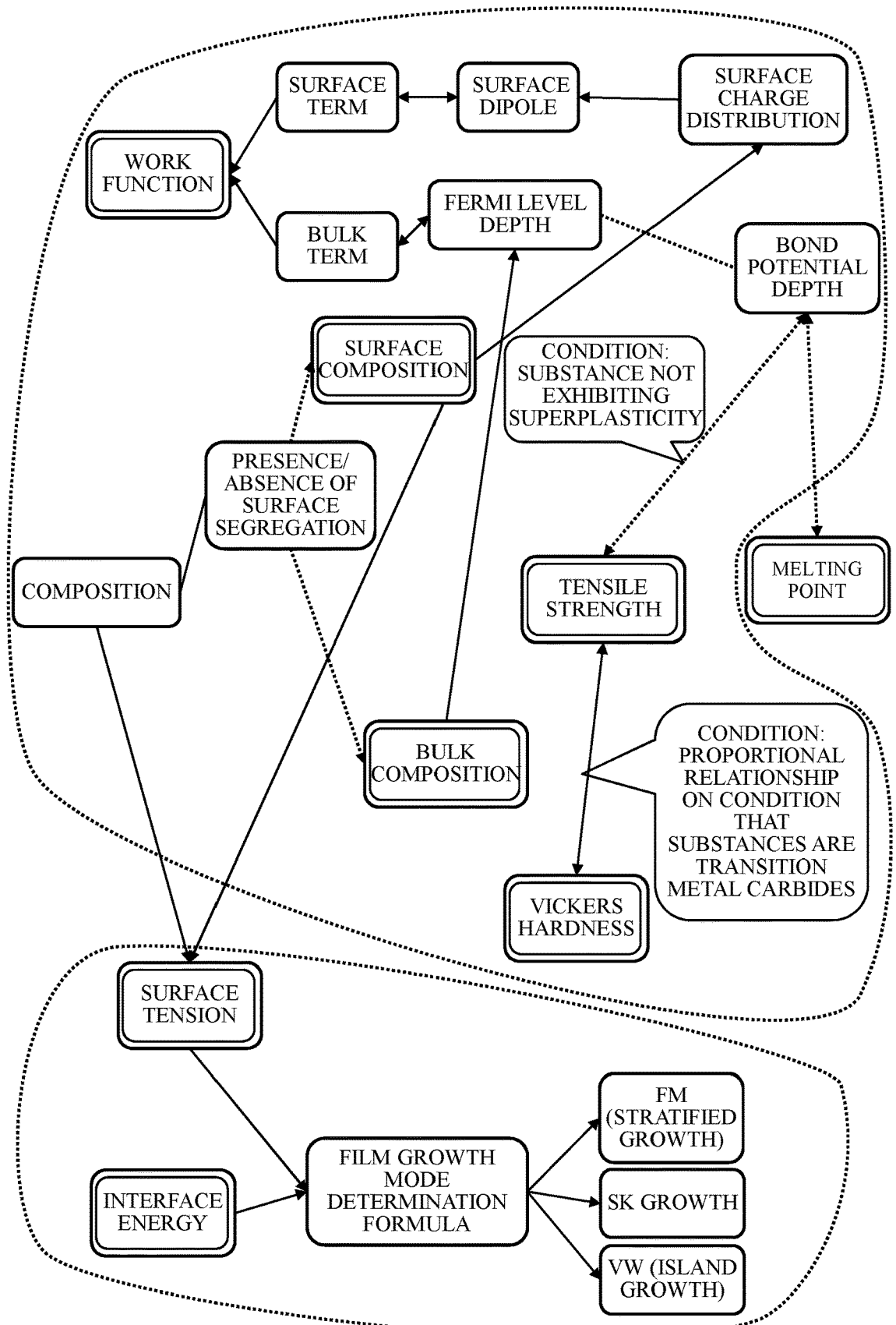
FIG. 15 is an explanatory diagram illustrating an example in which two graphs with no relevance to each other illustrated in FIG. 12 and FIG. 14 establish relevance when new nodes with relevance illustrated in FIG. 13 are added, and are integrated to a single graph.

FIG. 15 is an explanatory diagram illustrating an example in which two graphs with no relevance to each other illustrated in FIG. 12 and FIG. 14 establish relevance when new nodes with relevance illustrated in FIG. 13 are added, and are integrated to a single graph. To the graph illustrated in FIG. 12, a node "surface tension" and an edge between "composition" and "surface composition" are added as illustrated in FIG. 13. Therefore, the node "surface tension" becomes common with the graph illustrated in FIG. 14, and the two separate graphs are integrated. Although the node "melting point," added to FIG. 12, does not contribute to the integration with the graph of FIG. 14, integration of the graphs may expand a search range, that is, for example, presence/absence of relevance between "melting point" and "interfacial energy" can be examined.

As described above, the database 1 can be expanded by adding a new pair of material property parameters having a relationship based on knowledge different from before. Further, with this expansion, multiple graphs which have been recognized to have no relationship can be integrated. On the other hand, incorrectly input relationships can be deleted.

[Sixth Embodiment]

A material property database, as described above, that is useful for configuring a search system capable of searching an unknown combination of material property parameters having a significant relationship based on already known relationships from among multiple arbitrary combinations of material property parameters will be described.

FIG. 16 is an explanatory diagram illustrating a configuration example of a search system 10 including a material property database management apparatus 20 according to the sixth embodiment. The material property database management apparatus 20 is connected to one or multiple material property database search terminals 21_1 and 21_2 via the network 200 and, as a whole, the search system 10 is configured. Since the functions of the search system 10 to be configured are the same as those of the first to the fifth embodiments described above, detailed description thereof will be omitted.

The material property database management apparatus 20 includes a graph type database 3 held in a storage device, a graph generator 2 implemented as software on a computer, and a database interface 5.

The graph type database 3 is graph type information in which each of multiple material property parameters is associated with a single node, and an edge is provided between nodes corresponding to a pair of material property parameters having a relationship among pairs of material property parameters included in the plurality of material property parameters.

The database interface 5 is an interface through which pairs of material property parameters and relationships thereof can be input in the graph generator 2. In the same manner as described in each of the above embodiments, the database interface 5 supports management functions of the graph type database 3 such as writing information on the relationship of the material property parameters to the graph type database 3 and reading out and confirming the information stored in the graph type database 3 thereafter. The database interface 5 does not necessarily have to be limited to a human interface, and may be an interface to another database or a search system.

The database interface 5 extracts nodes and relationships of pairs of material property parameters by using natural language processing from, for example, academic papers, lecture/explanation materials, e-learning teaching materials, etc. published on the web.

Further, a pair of mutually related material property parameters is extracted, for example, ontologically and input in the graph generator 2. Here, ontology means a formal expression of knowledge as a set of concepts within a domain and a relationship between those concepts. Ontology provides a shared vocabulary used for modeling a certain domain, i.e., the types of objects and concepts and their characteristics and relationships present there. Therefore, regarding material property parameters that become nodes, common vocabulary is assigned to the same meaning and concept. Another vocabulary is possibly assigned in a case in which the same vocabulary is used for different meanings in different fields, that is, vocabulary confusion is occurring. For example, vocabulary confusion may occur in the term "work function." In a technical field in which a "work function" is supposed to be a material property parameter that is to be defined only with respect to a surface, description "a work function of the interface" whereas an "effective work function" to be defined for an interface may be simply described as a "work function." On the other hand, in the field in which there is a habit to call an "effective work function" to be defined for an interface simply a "work function," a "work function" in original meaning may be described as a "vacuum work function." If there is such vocabulary confusion, ontology is effective to treat material property parameters based on intrinsic meaning while excluding literal match/mismatch. For this reason, ontology may be published for each technical field.

In this manner, pairs of mutually related material property parameters can be extracted by using published or provided ontology.

The graph generator 2 checks whether the graph type database 3 includes nodes corresponding to the material property parameters constituting the input pair of material property parameters and edges corresponding to the relationship thereof, and adds nodes and/or edges not included in the graph type database 3 to the graph type database 3. Regarding pairs of material property parameters and relationships thereof that are already registered, it is possible to configure so that consistency can be determined. For example, an already registered relationship may be compared with newly input relationship in terms of their reliabilities, and the graph type database 3 can be updated with preference to the relationship with higher reliability. Further, when an already registered relationship and a newly input relationship are inconsistent, it is possible to make an inquiry to an administrator via the database interface 5 as to which of these is to be prioritized.

The material property database management apparatus 20 can further be connected to the network 200 such as the Internet via the network interface 103 and provide information about the graph type database 3 to one or multiple material property database search terminals 21_1 and 21_2 that are connected to the network 200. The material property database search terminals 21_1 and 21_2 are respectively provided with network interfaces 113 and 123, graph searchers 4_1 and 4_2, and user interfaces 6_1 and 6_2, and conduct a route search on the graph information of the graph type database 3 supplied by the material property database management apparatus 20 and can search a combination of material property parameters having a significant relationship.

In the description of the sixth embodiment, the database 1 and the graph 3 are not distinguished from each other, and the graph 3 itself is managed as a graph type database 3. However, as in the first embodiment, the database 1 and the graph 3 may be changed to be managed in a distinguished manner.

Although not illustrated, the material property database management apparatus 20 may further include a graph searcher 4 and a user interface 6 without via the network interface 103.

In this manner, a material property database that is useful for configuring a search system capable of searching an unknown combination of material property parameters having a significant relationship based on already known relationships from among multiple arbitrary combinations of material property parameters can be provided.

As described above, the material property database management apparatus 20 is connected to one or multiple material property database search terminals 21_1 and 21_2 via the network 200 and, as a whole, the search system 10 is configured. Functions of the search system 10 are the same as those of the first to the fifth embodiments.

That is, the database 3 may be a directed graph as in FIG. 4 and FIG. 6. Here, when a relationship between a pair of material property parameters is bidirectional, the graph generator 2 generates a bidirectional edge corresponding to the pair of material property parameters, and when a value of a first material property parameter of a pair of material property parameters is determined, a value of a second material property parameter is determined but not vice versa, a one-way edge from a node corresponding to the first material property parameter to a node corresponding to the second material property parameter is generated as an edge corresponding to the pair of material property parameters.

Therefore, a material property database that can appropriately treat one-way relationships having causal relationships and contribute to improvement in accuracy in route search can be provided.

Although not illustrated, the material property database management apparatus 20 may further include a condition extractor 7 as in FIG. 8 and FIG. 9.

Regarding a pair of material property parameters in which a condition for prescribing presence/absence of a relationship exists among multiple pairs of material property parameters having mutual relationships stored in the database 3, the condition extractor 7 extracts that condition, and stores a conditional edge, that is, an edge corresponding to a pair of material property parameters by which presence/absence of a relationship is prescribed by the extracted condition, in the database 3 with the condition.

Therefore, even a complicated relationship such that presence/absence of a relationship changes depending on a value of the material property parameter corresponding to the relationship or a value of another material property parameter can be included in a search range. Material property database search terminals 21_1 and 21_2 connected via the network 200 may determine whether a conditional edge is included in each of multiple routes output as a search result. When a conditional edge is included, it is possible, by determining whether the condition has been satisfied, to exclude routes passing through edges not satisfying the condition from the search result and output the search result. Therefore, even when a conditional edge is included, a route search with higher accuracy can be conducted.

Further, the database 3 may be configured to store reliability information of a relationship indicating that, from among multiple pairs of material property parameters having mutual relationships, a relationship is a theoretically established relationship or a relationship is an empirically correlated but not yet theoretically established relationship.

When the material property database search terminals 21_1 and 21_2 are provided with the graph searcher 4 and the search conditions include conditions concerning the reliability information, the database 3 can be searched based on the search conditions including the conditions. Therefore, a user can designate a search condition, such as to search a highly-reliable relationship with priority, in a material property database search terminal, whereby the user can conduct a route search with higher accuracy.

Although the invention made by the inventors has been described in detail based on the embodiments, the invention is not limited to the same, and may be changed in various ways without departing from the concept and scope thereof.

INDUSTRIAL APPLICABILITY

The invention is widely applicable to a search system and a search method using a database, and a material property database management apparatus thereof.

EXPLANATION OF SIGN

1 Material property parameter relationship database
2 Graph generator
3 Graph
4 Graph searcher
5 Database interface
6 User interface
7 Condition extractor
8 Route evaluator
9 Input rule 10 Search system
11 Input form for material property parameter relationship database
20 Material property database management apparatus
21 Material property database search terminal
100 Server
110, 120 Workstation
101, 111, 121 Computer
102, 112, 122 Storage device
103, 113, 123 Network interface
104, 114, 124 Input unit
105, 115, 125 Display unit
200 Network

The invention claimed is:

1. A search system, comprising:
a database interface unit;
a database;
a graph generator; and
a graph searcher,
wherein:
the database interface unit is configured to extract, from multiple information sources across various scientific fields, a plurality of pairs of material property parameters having mutual scientific relationships, the information sources including scientific literature, and the scientific fields including materials science, wherein, in each pair, a value of a material property parameter changes dependently on a change in a value of the other material property parameter in the pair according to a scientific principle;
the database is configured to store the plurality of pairs of material property parameters extracted from the plurality of sources;
the graph generator is configured to generate a graph in which nodes correspond to the material property parameters stored in the database and edges each of which is in between nodes corresponding to each pair of the plurality of pairs of material property parameters, each of the edges representing a relationship where the value of the material property parameter corresponding to a node connected to an edge changes dependently on the value of the material property parameter corresponding to the other node connected to the edge according to the scientific principle; and
the graph searcher is configured to search the graph based on a given search condition, and to output a search result representing new relationships between the material property parameters contained in the multiple information sources across various scientific fields, and
wherein:
the database is configured further to store reliability information of a relationship indicating that, from among the plurality of pairs of material property parameters having mutual relationships, a relationship is theoretically established in accordance with a scientific principle; and
when the condition about the reliability information is included in the search condition, the graph searcher searches the graph based on a search condition including that condition and outputs a search result.

2. The search system according to claim 1, wherein:
the graph is a directed graph; and
when a relationship between a pair of material property parameters is bidirectional, the graph generator generates a bidirectional edge corresponding to the pair of material property parameters, and
when a value of a first material property parameter of a pair of material property parameters is determined, a value of a second material property parameter is determined but not vice versa, the graph generator generates a one-way edge from a node corresponding to the first material property parameter to a node corresponding to the second material property parameter as an edge corresponding to the pair of material property parameters.

3. The search system according to claim 1, further comprising a condition extractor and a route evaluator, wherein:
regarding a pair of material property parameters in which a condition for prescribing presence/absence of a relationship in accordance with a scientific principle exists among the plurality of pairs of material property parameters having mutual relationships, the database is configured further to store that condition;
the condition extractor is configured to extract the condition from the database in association with the condition with an edge corresponding to a pair of material property parameters by which presence/absence of a relationship is prescribed by that condition being a conditional edge;
the graph searcher is configured to extract one or multiple routes from the graph and outputs as a search result; and
the route evaluator is configured to determine whether the one or multiple routes include the conditional edge and, excludes routes which include the conditional edge from the one or multiple routes if a condition corresponding to the conditional edge is not satisfied, and outputs the one or multiple routes as a search result.

4. The search system according to claim 1, further comprising a condition extractor and a route evaluator, wherein:
the condition extractor is configured to extract the reliability information from the database in association with the edge;
the graph searcher is configured to extract one or multiple routes from the graph as the search result irrespective of whether a condition about reliability information is included in the search condition, and outputs the one or multiple routes to the route evaluator; and
the route evaluator is configured to determine whether an edge with which the reliability information is associated is included in the one or multiple routes, and excludes routes which include the edge with which the reliability information is associated if the condition about reliability information included in the search condition is not satisfied, from the one or multiple routes, and outputs the one or multiple routes as a search result.

5. The search system according to claim 1, wherein:
the database interface unit is configured to determine whether a pair of material property parameters input from an outside and a relationship thereof conform to a predetermined input rule, and the pair of material property parameters conforming to the input rule and the relationship thereof are stored in the database, and the pair of material property parameters and the relationship thereof not conforming to the input rule are subject to predetermined error processing.

6. A search method comprising a database interface step, a graph generation step and a graph search step implemented by a database held in a storage apparatus and software on a computer, wherein:
in the database interface step, a plurality of pairs of material property parameters having mutual scientific relationships are extracted from multiple information sources across various scientific fields, the information sources including scientific literature, and the scientific fields including materials science, wherein, in each pair, a value of a material property parameter changes dependently on a change in a value of the other material property parameter in the pair according to a scientific principle;
the database is configured to store the plurality of pairs of material property parameters extracted from the plurality of sources;
in the graph generation step, a graph is generated in which nodes correspond to material property parameters stored in the database are nodes, and edges each of which is in between nodes corresponding to each pair of the plurality of pairs of material property parameters, each of the edges representing a relationship where the value of the material property parameter corresponding to a node connected to an edge changes dependently on the value of the material property parameter corresponding to the other node connected to the edge according to the scientific principle; and
in the graph search step, the graph is searched based on a given search condition, and a search result is output representing new relationships between the material property parameters contained in the multiple information sources across various scientific fields,
wherein:
the database is configured further to store reliability information of a relationship indicating that, from among the plurality of pairs of material property parameters having mutual relationships, a relationship is theoretically established in accordance with a scientific principle; and
when the condition about the reliability information is included in the search condition, the graph searcher searches the graph based on a search condition including that condition and outputs a search result.

7. The search method according to claim 5, wherein:
the graph is a directed graph;
in the graph generation step, when a relationship between a pair of material property parameters is bidirectional, a bidirectional edge corresponding to the pair of material property parameters is generated; and
when a value of a first material property parameter of a pair of material property parameters is determined, a value of a second material property parameter is determined but not vice versa, a one-way edge from a node corresponding to the first material property parameter to a node corresponding to the second material property parameter is generated as an edge corresponding to the pair of material property parameters.

8. The search method according to claim 5, further comprising a condition extraction step and a route evaluation step, wherein:
regarding a pair of material property parameters in which a condition for prescribing presence/absence of a relationship in accordance with a scientific principle exists among the plurality of pairs of material property parameters having mutual relationships, the database is configured further to store that condition;
in the condition extracting step, the condition is extracted from the database in association with the condition with an edge corresponding to a pair of material property parameters by which presence/absence of a relationship is prescribed by that condition being a conditional edge;
in the graph search step, one or multiple routes are extracted from the graph and output as a search result; and
in the route evaluation step, whether the one or multiple routes include the conditional edge is determined and, routes which include the conditional edge are excluded from the one or multiple routes if a condition corresponding to the conditional edge is not satisfied, and outputs the one or multiple routes as a search result.

9. The search method according to claim 6, further comprising a condition extraction step and a route evaluation step, wherein:
in the condition extraction step, the reliability information is extracted from the database in association with the edge;
in the graph searching step, one or multiple routes are extracted from the graph as the search result irrespective of whether a condition about reliability information is included in the search condition; and
in the route evaluation step, whether an edge with which the reliability information is associated is included in the extracted one or multiple routes, and excludes routes which include the edge with which the reliability information is associated if the condition about reliability information included in the search condition is not satisfied, from the one or multiple routes, and outputs the one or multiple routes as a search result.

10. The search method according to claim 6, wherein:
in the database interface step, whether a pair of material property parameters input from an outside and a relationship thereof conform to a predetermined input rule is determined, and the pair of material property parameters conforming to the input rule and the relationship thereof are stored in the database, and the pair of material property parameters and the relationship thereof not conforming to the input rule are subject to predetermined error processing.

11. A material property database management apparatus comprising a database held in a storage device, a graph generator implemented as software on a computer, and an interface unit, wherein:
the database is graph type information in which each of multiple material property parameters is associated with a single node, and an edge is provided between nodes corresponding to a pair of material property parameters having a relationship, the pair of material property parameters being included in the multiple material property parameters; the interface unit is configured to extract a plurality of pairs of material property parameters having mutual scientific relationships from multiple information sources including scientific literature across various scientific fields, the material property parameters being parameters representing properties of materials, and through the interface unit, the pair of material property parameters and a relationship thereof are inputtable with respect to the graph generator, wherein a value of a material property parameter of a pair of material property parameters changes dependently on a change in a value of the other material property parameter in the pair according to a scientific principle; and
the graph generator is configured to check whether the database includes nodes corresponding to the material property parameters constituting the input pair of material property parameters and edges corresponding to the relationship thereof, and adds nodes and/or edges not included in the database to the database, the graph generator being further configured to generate a graph including the nodes and edges, wherein each of the edges represents a relationship where the value of the material property parameter corresponding to a node connected to an edge changes dependently on the value of the material property parameter corresponding to the other node connected to the edge according to the scientific principle, and wherein a search result of the graph generated by the graph generator is configured to output a result representing new relationships between the material property parameters contained in the multiple information sources across various scientific fields, and wherein:

the database is configured further to store reliability information of a relationship indicating that, from among the plurality of pairs of material property parameters having mutual relationships, a relationship is theoretically established in accordance with a scientific principle; and when the condition about the reliability information is included in the search condition, the graph searcher searches the graph based on a search condition including that condition and outputs a search result.

12. The material property database management apparatus according to claim 11, wherein:

the database is a directed graph;

when a relationship between a pair of material property parameters is bidirectional, the graph generator generates a bidirectional edge corresponding to the pair of material property parameters, and when a value of a first material property parameter of a pair of material property parameters is determined, a value of a second material property parameter is determined but not vice versa, a one-way edge from a node corresponding to the first material property parameter to a node corresponding to the second material property parameter is generated as an edge corresponding to the pair of material property parameters.

13. The material property database management apparatus according to claim 11, further comprising a condition extractor, wherein:

regarding a pair of material property parameters in which a condition for prescribing presence/absence of a relationship in accordance with a scientific principle exists among the plurality of pairs of material property parameters having mutual relationships, the database is configured further to store that condition; and the condition extractor is configured to extract the condition from the database in association with the condition with an edge corresponding to a pair of material property parameters by which presence/absence of a relationship is prescribed by that condition being a conditional edge.

14. The material property database management apparatus according to claim 11, further comprising a condition extractor, wherein:

the condition extractor is configured to extract the reliability information from the database in association with the edge.

15. The search system according to claim 1, wherein the database interface unit is configured to extract the plurality of pairs of material property parameters using natural language processing with a shared vocabulary to relax vocabulary confusion in the plurality of technical fields.

16. The search method according to claim 6, wherein in the database interface step, the extraction of the plurality of pairs of material property parameters is performed using natural language processing with a shared vocabulary to relax vocabulary confusion in the plurality of technical fields.

17. The material property database management apparatus according to claim 11, wherein the interface unit is configured to extract the plurality of pairs of material property parameters using natural language processing with a shared vocabulary to relax vocabulary confusion in the plurality of technical fields.

* * * * *